(12) United States Patent
Kang et al.

(10) Patent No.: US 10,613,705 B2
(45) Date of Patent: Apr. 7, 2020

(54) METHOD AND APPARATUS FOR MANAGING APPLICATION PACKAGE INSTALLED IN MOBILE COMMUNICATION TERMINAL

(71) Applicant: Samsung Electronics Co., Ltd., Suwon-si, Gyeonggi-do (KR)

(72) Inventors: Hyeon-Jin Kang, Seoul (KR); Min Kim, Seoul (KR); Muthu Veerappan Alagappan, Suwon-si (KR); Young-Ki Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 14/716,122

(22) Filed: May 19, 2015

(65) Prior Publication Data

US 2015/0333982 A1    Nov. 19, 2015

(30) Foreign Application Priority Data

May 19, 2014    (KR) .................. 10-2014-0059850

(51) Int. Cl.
*G06F 3/0481* (2013.01)
*H04L 12/26* (2006.01)
*G06F 15/02* (2006.01)

(52) U.S. Cl.
CPC ...... *G06F 3/04817* (2013.01); *G06F 15/0225* (2013.01); *H04L 43/04* (2013.01)

(58) Field of Classification Search
USPC ........................................................ 709/224
See application file for complete search history.

(56) References Cited

U.S. PATENT DOCUMENTS

| | | | |
|---|---|---|---|
| 2004/0194153 A1 | 9/2004 | Garg et al. | |
| 2008/0313567 A1* | 12/2008 | Sabin | G06F 3/0481 715/835 |
| 2009/0024562 A1* | 1/2009 | Lee | G06F 9/445 |
| 2009/0271776 A1* | 10/2009 | Schreier | G06F 11/1417 717/170 |
| 2012/0036498 A1* | 2/2012 | Akirekadu | G06F 11/3495 717/124 |
| 2012/0260118 A1* | 10/2012 | Jiang | G06F 9/4843 713/340 |

(Continued)

FOREIGN PATENT DOCUMENTS

| | | |
|---|---|---|
| CN | 103493017 A | 1/2014 |
| EP | 2713641 A1 | 4/2014 |
| KR | 10-2012-0019637 A | 3/2012 |

OTHER PUBLICATIONS

Chinese Office Action with English translation dated Jul. 11, 2019; Chinese Appln. No. 201580039627.0.

*Primary Examiner* — Hermon Asres
(74) *Attorney, Agent, or Firm* — Jefferson IP Law, LLP

(57) ABSTRACT

A method of managing application packages installed in a mobile communication terminal is provided. The method includes detecting an application package which meets a condition for changing a state into an inactive state among the application packages and, if the detected application package is in the active state, changing a user interface corresponding to the detected application package to indicate the inactive state of the application package and displaying the changed user interface on a user screen.

22 Claims, 18 Drawing Sheets

(56) References Cited

U.S. PATENT DOCUMENTS

| | | |
|---|---|---|
| 2013/0097560 A1 | 4/2013 | Park et al. |
| 2013/0268885 A1 | 10/2013 | Lim et al. |
| 2013/0339937 A1* | 12/2013 | Meggison, Sr. .......... G06F 8/61 |
| | | 717/168 |
| 2014/0007122 A1* | 1/2014 | Udeshi ................. G06F 9/4893 |
| | | 718/103 |
| 2014/0047458 A1 | 2/2014 | Li et al. |
| 2014/0113611 A1 | 4/2014 | Ye |
| 2014/0201681 A1* | 7/2014 | Mahaffey .......... H04M 1/72569 |
| | | 715/846 |

* cited by examiner

MAPPING OF IMPORTANCE FOR EACH PROCESS STATE

| Flag (ActivityManager) | Values | Flag (RunningAppProcessInfo) | importance |
|---|---|---|---|
| PROCESS_STATE_PERSISTENT | 0 | IMPORTANCE_FOREGROUND | 100 |
| PROCESS_STATE_PERSISTENT_UI | 1 | IMPORTANCE_FOREGROUND | 100 |
| PROCESS_STATE_TOP | 2 | IMPORTANCE_FOREGROUND | 100 |
| PROCESS_STATE_IMPORTANT_FOREGROUND | 3 | IMPORTANCE_VISIBLE | 200 |
| PROCESS_STATE_IMPORTANT_BACKGROUND | 4 | IMPORTANCE_PERCEPTIBLE | 130 |
| PROCESS_STATE_BACKUP | 5 | IMPORTANCE_PERCEPTIBLE | 130 |
| PROCESS_STATE_HEAVY_WEIGHT | 6 | IMPORTANCE_CANT_SAVE_STATE | 170 |
| PROCESS_STATE_SERVICE | 7 | IMPORTANCE_SERVICE | 300 |
| PROCESS_STATE_RECEIVER | 8 | IMPORTANCE_SERVICE | 300 |
| PROCESS_STATE_HOME | 9 | IMPORTANCE_BACKGROUND | 400 |
| PROCESS_STATE_LAST_ACTIVITY | 10 | IMPORTANCE_BACKGROUND | 400 |
| PROCESS_STATE_LAST_CACHED_ACTIVITY | 11 | IMPORTANCE_BACKGROUND | 400 |
| PROCESS_STATE_LAST_CACHED_ACTIVITY_CLIENT | 12 | IMPORTANCE_BACKGROUND | 400 |
| PROCESS_STATE_LAST_CACHED_EMPTY | 13 | IMPORTANCE_BACKGROUND | 400 |

FIG. 11B

PRIORITIES TO BE REMOVED WHEN MEMORY FOR EACH PROCESS STATE IS LACKING (OOM_ADJ)

| Flag | Values | Brief info |
| --- | --- | --- |
| CACHED_APP_MAX_ADJ | 15 | This is a process only hosting activities that are not visible so it can be killed without any disruption |
| CACHED_APP_MIN_ADJ | 9 | This is a process only hosting activities that are not visible so it can be killed without any disruption |
| SERVICE_B_ADJ | 8 | non important services (old and decrepit services) |
| PREVIOUS_APP_ADJ | 7 | the previous foreground application |
| HOME_APP_ADJ | 6 | Home App |
| SERVICE_ADJ | 5 | contains an application service |
| HEAVY_WEIGHT_APP_ADJ | 4 | Background heavy weight app |
| BACKUP_APP_ADJ | 3 | Backup App |
| PERCEPTIBLE_APP_ADJ | 2 | Not Visible but noticeable (Music App in background) |
| VISIBLE_APP_ADJ | 1 | Visible apps |
| FOREGROUND_APP_ADJ | 0 | Foreground App |
| PERSISTENT_PROC_ADJ | -12 | system persistent process(telephony..) |
| SYSTEM_ADJ | -16 | System process |
| NATIVE_ADJ | -17 | native processes that are not being managed by the system |

FIG.11C

METHOD AND APPARATUS FOR MANAGING APPLICATION PACKAGE INSTALLED IN MOBILE COMMUNICATION TERMINAL

CROSS-REFERENCE TO RELATED APPLICATION(S)

This application claims the benefit under 35 U.S.C. § 119(a) of a Korean patent application filed on May 19, 2014 in the Korean Intellectual Property Office and assigned Serial No. 10-2014-0059850, the entire disclosure of which is hereby incorporated by reference.

TECHNICAL FIELD

The present disclosure relates to a method and apparatus for managing an application package installed in a mobile communication terminal.

BACKGROUND

Recently, as the use of mobile communication terminals, including smart phones, smart pads, and the like, has rapidly increased, operations for driving applications through functions of corresponding terminals by users have become popular. To this end, a user accesses a communication service providing server or an application providing server to download, install, and use a package of an application which can implement a function which the user desires to use. The package may be defined in units of applications, which can be executed within the terminal. In order to install one application, one or more packages may exist.

A package installed in the terminal based on Android, which an operating system of a mobile communication terminal, may include an "active" state in which an application corresponding to the corresponding package can be driven, and an "inactive" state in which the application has been installed but cannot be driven anymore. The "inactive" state refers to a state in which a user setting for the corresponding package is still maintained in a storage space of the terminal, but cannot be loaded to a memory or cannot be driven. The package installed in the terminal based on Android exists in one of the two states.

Meanwhile, applications that can be installed in the corresponding terminal may be classified into a charged service, which can be used after the cost is paid, and a free service which can be used without separate costs. Since the application corresponding to the free service does not require payment, the corresponding user may often install the application without burden even though the application does not need to be installed specially. Further, although the user has installed the application corresponding to the free service in the corresponding terminal and does not use the application anymore, the user does not recognize the necessity to remove the package, so the package continuously remains in an installed state in many cases. Among packages installed in the terminal, there is an application which may be automatically executed when the terminal is turned "ON" or an application of which an operation state cannot be recognized by the user even though the corresponding application is being executed. In this case, resources required for processing calculations for a Central Processing Unit (CPU), a memory, or the like within the terminal may be occupied by the application or mobile data may be used according to the use of a cellular data network such as Wideband Code Division Multiple Access (W-CDMA), Long Term Evolution (LTE) or the like. Accordingly, power of the terminal is consumed and a charge for mobile data is made. Therefore, a method of managing applications which have not been used for a predetermined period among applications installed in the corresponding terminal is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of detecting a package which has not been used for a predetermined period among packages installed in a mobile communication terminal, determining whether to change a state of the detected package into an "inactive" state or remove the detected package, and displaying a User Interface (UI) showing the changed state of the package by a user.

Another aspect of the present disclosure is to provide a method of displaying a UI corresponding to a package installed in a mobile communication terminal to actively indicate a non-used state of the corresponding package.

In accordance with an aspect of the present disclosure, a method of managing application packages installed in a mobile communication terminal is provided. The method includes detecting an application package which meets a condition for changing a state into an inactive state among the application packages and, if the detected application package is in the active state, changing a user interface corresponding to the detected application package to indicate the inactive state of the application package and displaying the changed user interface on a user screen.

In accordance with another aspect of the present disclosure, a mobile communication terminal managing installed application packages is provided. The mobile communication terminal includes a controller configured to detect an application package which meets a condition for changing a state into an inactive state among the application packages, if the detected application package is in the active state, change a user interface corresponding to the detected application package to indicate the inactive state of the application package, and control a screen display unit to display the changed user interface on a user screen.

Aspects of the present disclosure are to detect a package which has not been used for a predetermined period, and inactivate a state of the package or remove the package, thereby preventing resources required for processing calculations from being unnecessarily occupied or preventing the cellular network from being used by unintended execution of the application by the user.

Further, according to aspects of the present disclosure, a UI corresponding to an inactivated package is displayed to show an inactive state of the package, so that the user can easily recognize the state in which the corresponding application is not driven anymore without intended execution by the user.

In addition, according to aspects of the present disclosure, a UI corresponding to a package installed in a mobile communication terminal is provided to actively indicate a non-used state of the corresponding package, so that the user can easily recognize a use state of each package installed in the terminal and thus more efficiently manage the installed packages.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11B is a table showing a mapping relation of importance for each process state according to an embodiment of the present disclosure; and FIG. 11C is a table showing priorities to be first controlled when a memory for each process state is lacking according to an embodiment of the present disclosure.

Throughout the drawings, it should be noted that like reference numbers are used to depict the same or similar elements, features, and structures.

DETAILED DESCRIPTION

Figure 1:
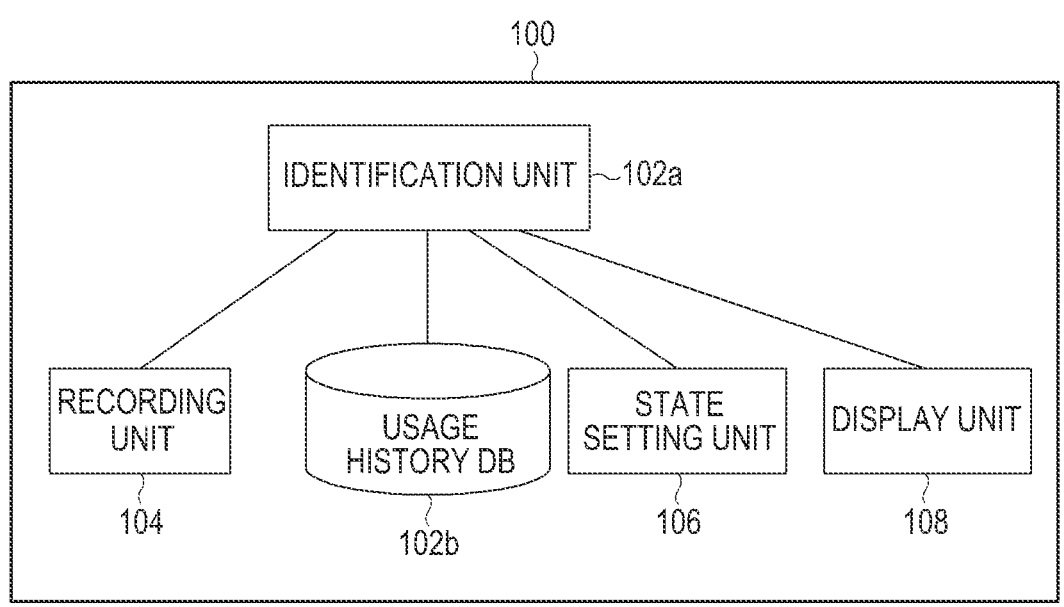
FIG. 1 illustrates an example of a configuration of a terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a method of managing an application package installed in a terminal. According to an embodiment of the present disclosure, it is assumed that the terminal downloads a package for an application to install and implement the downloaded application package. For example, the terminal operates based on an Android operating system. More specifically, an embodiment of the present disclosure proposes a display method of changing, according to a non-used period, a User Interface (UI) corresponding to each package installed in the terminal on a display screen of the terminal. In this case, a user may recognize a non-used state of the corresponding package through the changed UI on the display screen, and directly change the state of the package into an inactive state or remove the package.

Further, according to an embodiment of the present disclosure, the user may detect a package which has not been used for a predetermined period among packages installed in the corresponding terminal. When a preset condition is met, the user may change a state of the detected package into an "inactive" state or remove the detected package. According to an embodiment of the present disclosure, the user is questioned whether to change the state of the detected package or remove the detected package, and a corresponding operation may be performed according to a user input for the question. Further, the package of which the state is determined to be changed into the "inactive" state is displayed on the display screen of the terminal to inform that the corresponding UI is in the "inactive" state.

In order to implement the embodiment of the present disclosure, the terminal may include, for example, a "recording unit", a "usage history DataBase (DB)", an "identification unit", and a "state setting unit". In such components of the terminal, one component may be combined with other components or may be divided into finer components according to another embodiment or an implementation situation.

FIG. 1 illustrates an example of a configuration of a terminal according to an embodiment of the present disclosure.

Referring to FIG. 1, a terminal 100 includes, for example, an identification unit 102a, a usage history DB 102b, a recording unit 104, a state setting unit 106, and a display unit 108.

The recording unit 104 records usage histories of the corresponding application according to each package installed in the terminal 100 in the usage history DB 102b. When the terminal 100 operates based on an Android operating system, the usage history DB 102b may use a Least Recently Used (LRU) list in a detailed embodiment. The LRU list may include applications, which are most recently used, among the applications installed in the terminal More specifically, the usage history DB 102b maps and stores the usage history of each of the packages installed in the terminal 100. The usage history may include a start time at which the user executes the corresponding application, an end time at which the user ends the application, and a time at which the application is executed or ended in a display area (not shown) of the terminal 100. Further, the usage history may include accumulation times and accumulation periods which are mapped to each other, the accumulation time and the accumulation period being generated by accumulating times at which the corresponding application is executed for a predetermined time. In addition, the accumulation period may be set by the user. The accumulation period may be set, for example, in the unit of days or months.

The identification unit 102a identifies a state of each of the installed packages and whether the corresponding package meets a condition preset for changing the state of the corresponding package, determines whether the state of the corresponding package changes based on a result of the identification, and informs the state setting unit 106 of the determination. The condition may be divided into, for example, an inactive state change condition for determining whether to change the state of the corresponding package into an inactive state, an active state change condition for determining whether to change the state of the package into an active state, and a condition for removing the corresponding package. The inactive state change condition may include "a case where a non-used period of each of the installed packages is longer than or equal to a preset inactivation threshold". In an embodiment, the threshold may be determined as a number of hours, a number of days, a number of weeks, etc. The inactivation threshold may vary depending on each package according to a user's inclination considering a characteristic of the application supported by the corresponding package. For example, it is assumed that the user installs a package of an application for reserving each of a movie ticket and a ticket for mass transportation, for example, a train ticket. Further, it is assumed that the user sees a movie sometimes but goes on a business trip often. Then, the user may configure an inactivation threshold of the movie reservation application to be relatively longer than an inactivation threshold of the train ticket reservation application.

Further, the inactive state change condition may be configured using at least one of current consumption of the packages installed in the terminal, execution frequency, memory occupancy rate, and accumulation time of the execution on the display screen. For example, the inactive state change condition may include "a case where the preset number of packages is selected according to an order of high power consumption (or high consumption of charged cellular data) and execution frequencies of the selected packages are equal to or smaller than a threshold". According to an embodiment of the present disclosure, although not illustrated, the inactive state change condition may include "a case where an occupancy rate of a memory, for example, a Random Access Memory (RAM) within the terminal 100 is larger than or equal to a predetermined occupancy rate". Alternatively, the inactive state change condition may include "a case where the predetermined number of packages is selected according to an order of high RAM occupancy rate and execution frequencies of the selected packages are equal to or smaller than a threshold".

Alternatively, the inactive state change condition may include information on whether a time for which an execution screen of the corresponding application displayed on a display screen of the terminal is shorter than a predetermined threshold time or whether a use frequency of the corresponding application for a predetermined unit time is smaller than a preset use frequency threshold. Alternatively, the inactive state change condition may include a case where currents consumed by the corresponding application for a predetermined unit time is larger than a preset current threshold by a predetermined unit. When the consumed current is excessively larger than the average current, an error range of the current with respect to the average current may be preset and whether the current consumed by the corresponding application exceeds the corresponding error range may be identified. Accordingly, whether the corresponding condition is met may be determined.

According to an embodiment of the present disclosure, the inactive state change condition may be configured by selecting two or more conditions from the aforementioned conditions and combining the selected conditions into one condition.

According to an embodiment of the present disclosure, the identification unit 102a may pre-store an inactivation exception list including packages to which a state change into the "inactive" state is not applied. The inactivation exception list may include packages which should be basically installed in the terminal, and may further include packages according to a user setting. For example, it is assumed that the inactivation exception list may include a user who carries out banking through only a mobile service without using a bank. In this case, although the user does not frequently use an application supporting mobile Internet banking, the application may be included in the inactive state change exception list. In the corresponding embodiment, when a package which meets one of the aforementioned inactive state change conditions is detected in the packages installed in the terminal, the identification unit 102a additionally identifies whether the detected package is included in the inactive state change exception list. Further, when the detected package is not included in the inactive state change list based on a result of the additional identification, the identification unit 102a may change the state of the package into the inactive state. Alternatively, according to an embodiment of the present disclosure, the identification unit 102a may inquire about the change into the inactive state of the package and determine the change into the inactive state of the package based on a result of the inquiry. When the detected package is included in the inactive state change exception list based on a result of the additional identification, the identification unit 102a maintains the state of the detected package.

Meanwhile, according to an embodiment of the present disclosure, the inactive state change condition may be differently configured according to each application in consideration of a characteristic of the corresponding application. In this case, applications installed through Play Store corresponding to a market providing applications, which can be used by Android, have at least one category such as game, shopping, weather, widget, and the like. Based on a characteristic according to each category, the user may configure different inactivation thresholds according to categories of the corresponding applications. Since the execution frequency according to each category may also vary depending on a user's inclination, the execution frequency may be randomly configured by the corresponding user.

Meanwhile, when the package that meets the inactive state change condition is detected, the identification unit 102a may determine to remove the detected package and transmit an instruction to change the state of the detected package into the inactive state to the state setting unit 106. According to an embodiment of the present disclosure, when the package which meets the inactive state change condition is detected, the identification unit 102a may inquire about whether to change the state of the detected package into the inactive state and perform an operation corresponding to a user input for the inquiry. For example, when the user input for the inquiry corresponds to "rejection of the change into the inactive state", the identification unit 102a stops the operation for state change of the package. Further, when the user input for the inquiry corresponds to "acceptance of the change into the inactive state" the identification unit 102a transmits an instruction to change the state of the detected package into the inactive state to the state setting unit 106.

Further, the identification unit 102a may detect an application which meets the active state change condition or removal condition, and transmit an instruction to change the state of the detected package into the active state or remove the detected package to the state setting unit 106. Alternatively, according to an embodiment of the present disclosure, the identification unit 102a may inquire the user about whether to change the state of the detected application into the active state or remove the detected application, and perform an operation corresponding to a user input for the inquiry. Alternatively, when a push message for an application supporting a push service is received, the identification unit 102a may transmit an instruction to change the state of the application into the inactive state to the state setting unit 106.

The state setting unit 106 may change the state of the application of the corresponding package into the active or inactive state or remove the application according to the instruction received from the identification unit 102a. When the inactive state of the corresponding application is changed into the active state, the application switches to an available state. In this case, the application of which inactive state has been changed into the active state may be directly executed, or only the change into the active state of the application may be performed.

Thereafter, the state setting unit 106 transmits information on the application of which the state has been changed to the display unit 108. Then, the display unit 108 changes a UI of the application corresponding to the information to indicate the changed state of the application, and displays the changed UI on a display screen of the terminal 100. Hereinafter, an icon will be described as an example of the UI. When the state of the corresponding application is changed to the "inactive" state, the display unit 108 may overlap an "ice icon" with an icon of the application to change the display as if the icon of the application freezes. Accordingly, as the user identifies the icon which overlaps the ice icon on the display screen, the user may identify that the application corresponding to the icon is in the inactive state.

According to an embodiment of the present disclosure, with respect to an inactivation threshold set to the corresponding application, the display unit 108 may change and display the icon of the application in the form indicating the number of days for which the application has not been used up to the present. Such a display example will be described later with reference to FIG. 4. Further, when the inactive state of the corresponding application is changed into the active state, the display unit 108 may change the icon of the application into an icon indicating the active state and display the changed icon. In addition, according to an embodiment of the present disclosure, the display unit 108 may immediately display an execution screen of the application corresponding to the icon simultaneously with the change of the icon.

The display unit 108 may express each state of the packages installed in the terminal 100, that is, the inactive state and the active state through various methods. A representative example may include a method of visually differently expressing the icon according to the inactive state and the active state. As described above, the display may be made by overlapping the ice icon indicating the inactive state with the corresponding icon or overlapping the number indicating the number of days, for which the corresponding application has not been used, with the corresponding icon.

Hereinafter, examples of operations for determining packages to which the state change will be applied among the packages installed in the terminal and displaying the determined packages according to an embodiment of the present disclosure will be described with reference to FIGS. 2A to 7.

Figure 2A:
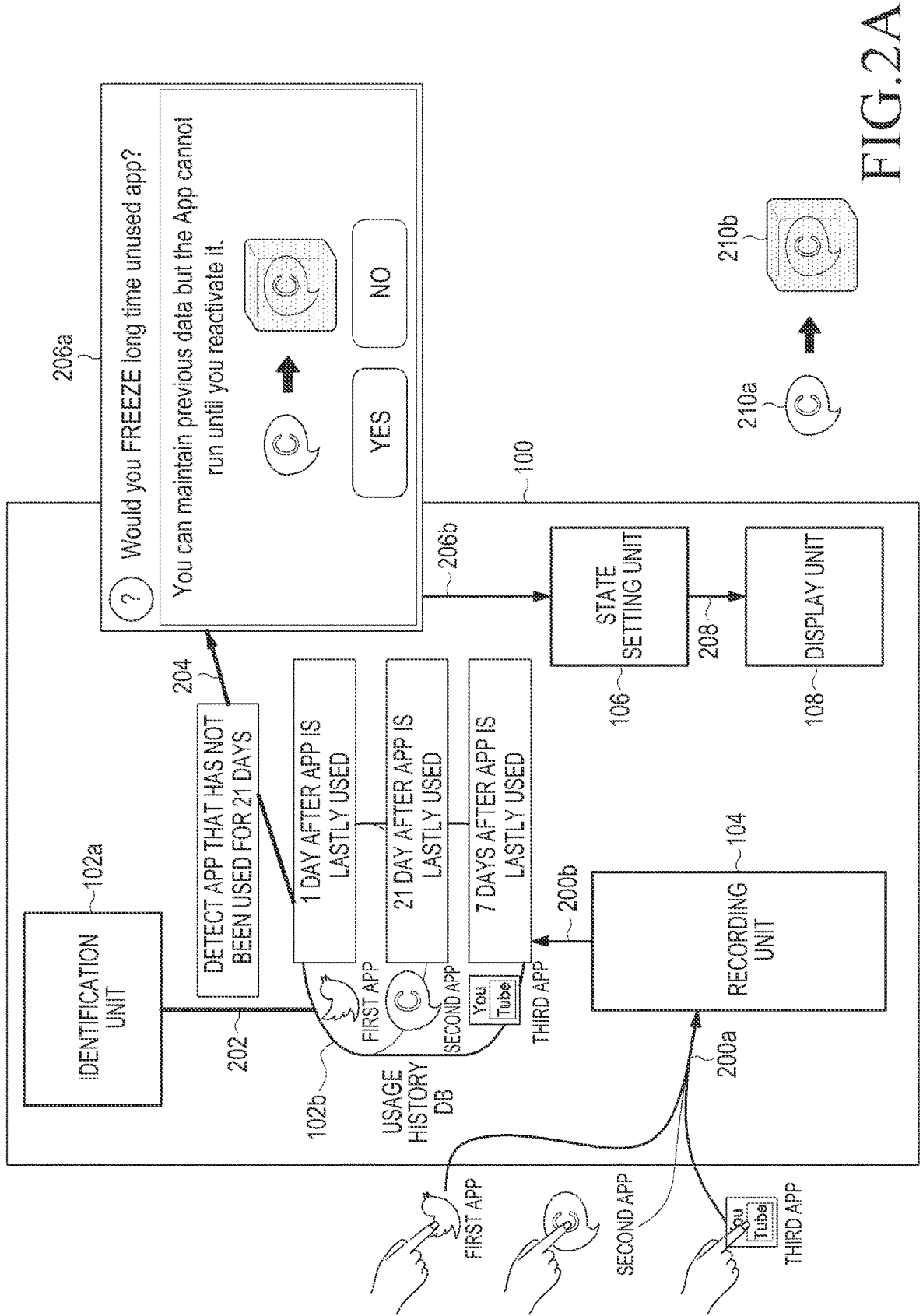
FIG. 2A illustrates an example of an operation for changing a state of a package installed in a terminal into an inactive state according to an embodiment of the present disclosure.

FIG. 2A illustrates an example of an operation for changing a state of a package installed in a terminal into an inactive state according to an embodiment of the present disclosure. For the convenience of the description, it is assumed that the terminal of FIG. 2A corresponds to the terminal 100 of FIG. 1.

Referring to FIG. 2A, it is assumed that three applications, that is, a first application (APP), a second APP, and a third APP which support different functions are installed in the terminal 100.

When the recording unit 104 detects the use of each of the applications in operation 200a, the recording unit 104 collects corresponding usage histories, and updates the collected usage histories according to each application in the usage history DB 102b in operation 200b. For example, whenever the application of the corresponding package among the packages installed in the terminal 100 is executed, the recording unit 104 may map the start time with the usage history of the corresponding application and store the mapped information in the usage history DB 102b. Alternatively, the end time of the execution of the application of the corresponding package or the time at which the execution screen of the corresponding application disappears from the display area may be stored in the usage history DB 102b as the usage history of the corresponding application.

As described above, the usage history according to each application, which is stored in the usage history DB 102b may be read by the identification unit 102a at a preset reading time in operation 202. The reading time of the identification unit 102a may be configured, for example, as the time when charging of the terminal 100 is initially full every day. In another example, the reading time may be configured as the time when the terminal 100 is initially unlocked to be used by the user every day. In an embodiment of the present disclosure, the reading time may be configured as a preset date every month, and the user may identify the time when the installed applications are lastly used every corresponding date every month. Meanwhile, in the corresponding embodiment of the present disclosure, it is assumed that the usage history DB 102b stores usage histories of the three applications, that is the first APP, the second APP, and the third APP installed in the terminal 100, and the usage history corresponds to the lastly used day of the corresponding application. Then, the identification unit 102a may identify the lastly used day of each of the first APP, second APP, and third APP in the usage history DB 102b and may count non-used days of each of the corresponding applications at the present time. For example, it is assumed that the number of days, for which the first APP has not been used, is "1", the number of days for which the second APP has not been used, is "21", and the number of days for which the third APP has not been used, is "7".

At this time, it is assumed that the state change condition is configured such that "the number of days, for which the application has not been used, is larger than or equal to an inactive threshold" and the inactive threshold is 21 days. Then, the identification unit 102a identifies that the second APP, which has not been used for 21 days corresponding to the inactive threshold among the first APP to the third APP, meets the inactive state change condition. According to an embodiment of the present disclosure, in operation 204, the identification unit 102a may determine to change the state of the second APP into the inactive state and transmit an instruction to change the state of the second APP into the inactive state to the state setting unit 106. Alternatively, according to an embodiment of the present disclosure, in operation 204, the identification unit 102a may display, on a display screen (not shown) of the terminal 100, an inquiry window for allowing the user to determine the state change of the second APP into the "inactive state" in the form of a popup window 206a. For example, the inquiry window 206a provides the user with a selection button corresponding to "YES" or "NO" to determine whether to change the state of the second APP into the inactive state. For example, in the inquiry window 206a, an icon indicating the active state of the second APP may be mapped to and displayed on the "YES" button and an icon indicating the inactive state of the second APP, that is, an icon generated by overlapping the icon of the second APP with an ice icon may be mapped to and displayed on the "NO" button. For example, it is assumed that, when a user input is detected through the popup window 206a, the user presses the "YES" button. In this case, the user input may be executed by a touch input of the corresponding button. Then, in operation 206b, the identification unit 102a transmits an instruction for the state change of the second APP corresponding to the user input to the state setting unit 106. That is, when the second APP is currently in the active state, the instruction indicates the state change of the second APP into the inactive state in response to the user input. When the second APP is currently in the inactive state, the identification unit 102a may determine to remove the second APP and transmit an instruction to remove the second APP to the state setting unit 106. Alternatively, according to an embodiment of the present disclosure, the identification unit 102a may display the popup window for inquiring about whether to remove the second APP on the display screen. Further, the identification unit 102a may transmit an instruction for the state change of the second APP based on the user input made through the popup window to the state setting unit 106 in operation 206b.

In operation 208, the state setting unit 106 changes the state of the second APP into the "inactive state" or remove the second APP in response to the instruction received from the identification unit 102a, and controls the display unit 108 to display an icon indicating the changed state of the second APP on the display screen of the terminal 100. That is, when the state of the second APP is changed into the inactive state, the display unit 108 having received information on the state change may display, for example, an icon 210b which is generated by overlapping an icon 210a of the second APP with an ice icon on the display screen of the terminal 100.

Figure 2B:
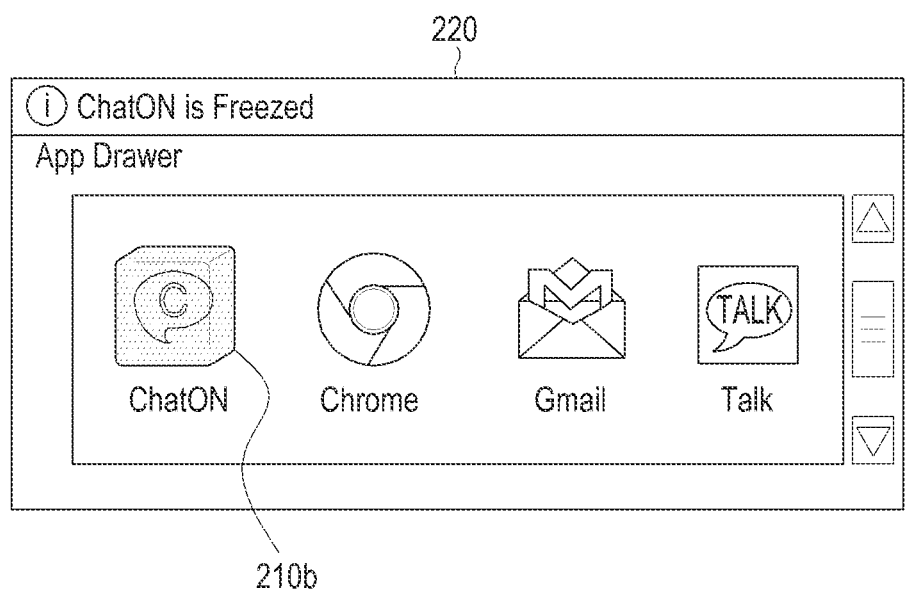
FIG. 2B illustrates an example of a display screen of a terminal on which a display unit displays an icon indicating a state change according to an embodiment of the present disclosure.

FIG. 2B illustrates an example of a display screen of a terminal on which a display unit displays an icon indicating a state change according to an embodiment of the present disclosure.

Referring to FIG. 2B, when the state of the second APP is changed into the inactive state in operation 208, the display unit 108 may display an application drawer 220 including icons corresponding to installed packages and the icon of the second APP, which has changed to indicate the "inactive state" on the display screen of the terminal 100. Here, it is assumed that an icon 210b of the second APP corresponds to "Chat ON" providing chatting with registered users. The application drawer 220 includes, for example, the icon 210b generated by overlapping the icon 210a of the second APP with the ice icon and other icons displayed in the active state.

Alternatively, the display unit 108 having received the instruction to remove the icon of the second APP removes the icon of the second APP from the display screen.

According to an embodiment of the present disclosure, it is assumed that the inactive state change condition is configured such that "a RAM occupancy rate is larger than or equal to a predetermined occupancy rate". In this case, when the recording unit 104 detects the use of each of the applications, the recording unit 104 collects RAM occupancy rates by the corresponding use, and updates the collected RAM occupancy rates according to each application in the usage history DB 102b in operation 200b. For example, when a RAM occupancy rate of a particular application increases according to the download of contents during a process of using the particular application, the RAM occupancy rate of the particular application, which is stored in the usage history DB 102b, is updated into the increased RAM occupancy rate. Similarly, as described above, the RAM occupancy rate according to each application, which is stored in the usage history DB 102b may be read by the identification unit 102a at a preset reading time. Then, the identification unit 102a may identify the RAM occupancy rate according to each application in the usage history DB 102b at the preset reading time. The identification unit 102a identifies that the RAM occupancy rate of each of the applications, for example, the RAM occupancy rate of the first APP is larger than the predetermined occupancy rate and thus meets the inactive state change condition. According to an embodiment of the present disclosure, the identification unit 102a may determine to change the state of the second APP into the inactive state and transmit an instruction to change the state of the second APP into the inactive state to the state setting unit 106. Alternatively, according to an embodiment of the present disclosure, the identification unit 102a may display, on the display screen (not shown) of the terminal 100, the inquiry window for allowing the user to determine whether to change the state of the second APP into the "inactive state" in the form of the popup window 206a. For example, the inquiry window 206a provides the user with a selection button corresponding to "YES" or "NO" to determine whether to change the state of the first APP into the inactive state. For example, in the inquiry window 206a, an icon indicating the active state of the first APP may be mapped to and displayed on the "YES" button and an icon indicating the inactive state of the first APP, that is, an icon generated by overlapping the icon of the first APP with an ice icon may be mapped to and displayed on the "NO" button. For example, it is assumed that, when a user input is detected through the popup window 206a, the user presses the "YES" button. In this case, the user input may be executed by a touch input of the corresponding button. Then, the identification unit 102a transmits an instruction for the state change of the first APP corresponding to the user input to the state setting unit 106. That is, when the first APP is currently in the active state, the instruction indicates the state change of the first APP into the inactive state in response to the user input. When the first APP is currently in the inactive state, the identification unit 102a may determine to remove the first APP and transmit an instruction to remove the first APP to the state setting unit 106. Alternatively, according to an embodiment of the present disclosure, the identification unit 102a may display the popup window for inquiring about whether to remove the first APP on the display screen. Further, the identification unit 102a may transmit an instruction for the state change of the first APP based on the user input made through the popup window to the state setting unit 106.

The state setting unit 106 changes the state of the first APP into the "inactive state" or removes the first APP in response to the instruction received from the identification unit 102a, and controls the display unit 108 to display an icon indicating the changed state of the first APP on the display screen of the terminal 100. That is, when the state of the first APP is changed into the inactive state, the display unit 108 having received information on the state change may display, for example, an icon 210b which is generated by overlapping an icon 210a of the first APP with an ice icon on the display screen of the terminal 100. Meanwhile, according to an embodiment of the present disclosure, the state setting unit 106 pre-stores the aforementioned inactive state change exception list. The state setting unit 106 identifies whether the second APP or the first APP, which meets the aforementioned inactive state change condition, is included in the inactive state change exception list. When the first APP or the second APP is not included in the inactive state change exception list based on a result of the identification, the state setting unit 106 may change the state of the first APP or the second APP in response to the instruction received from the identification unit 102a or remove the first APP or the second APP. In contrast, when the first APP or the second APP is included in the inactive state change exception list, the state setting unit 106 maintains the state of the first APP or the second APP.

Meanwhile, according to an embodiment of the present disclosure, the state setting unit 106 may detect a user input indicating the state change of the corresponding application regardless of the instruction acquired from the identification unit 102a. For example, when a user input for an icon of a particular application, for example, a touch input for a predetermined time or longer is detected on the display screen, the state setting unit 106 may control the display unit 108 to display, as the icon of the particular application, an icon 210b generated by overlapping an icon 210a of the second APP or the first APP with the ice icon, which is corresponding to a "non-used" state.

Further, it is assumed that, when the corresponding icon is touched for X seconds, a particular command is called. For example, when a touch input of the corresponding icon is detected for a preset time range, for example, until X+3 seconds after X+1 seconds, the state setting unit 106 may change the state of the application corresponding to the icon into the inactive state, or the inactive state of the application into the active state.

Figure 3A:
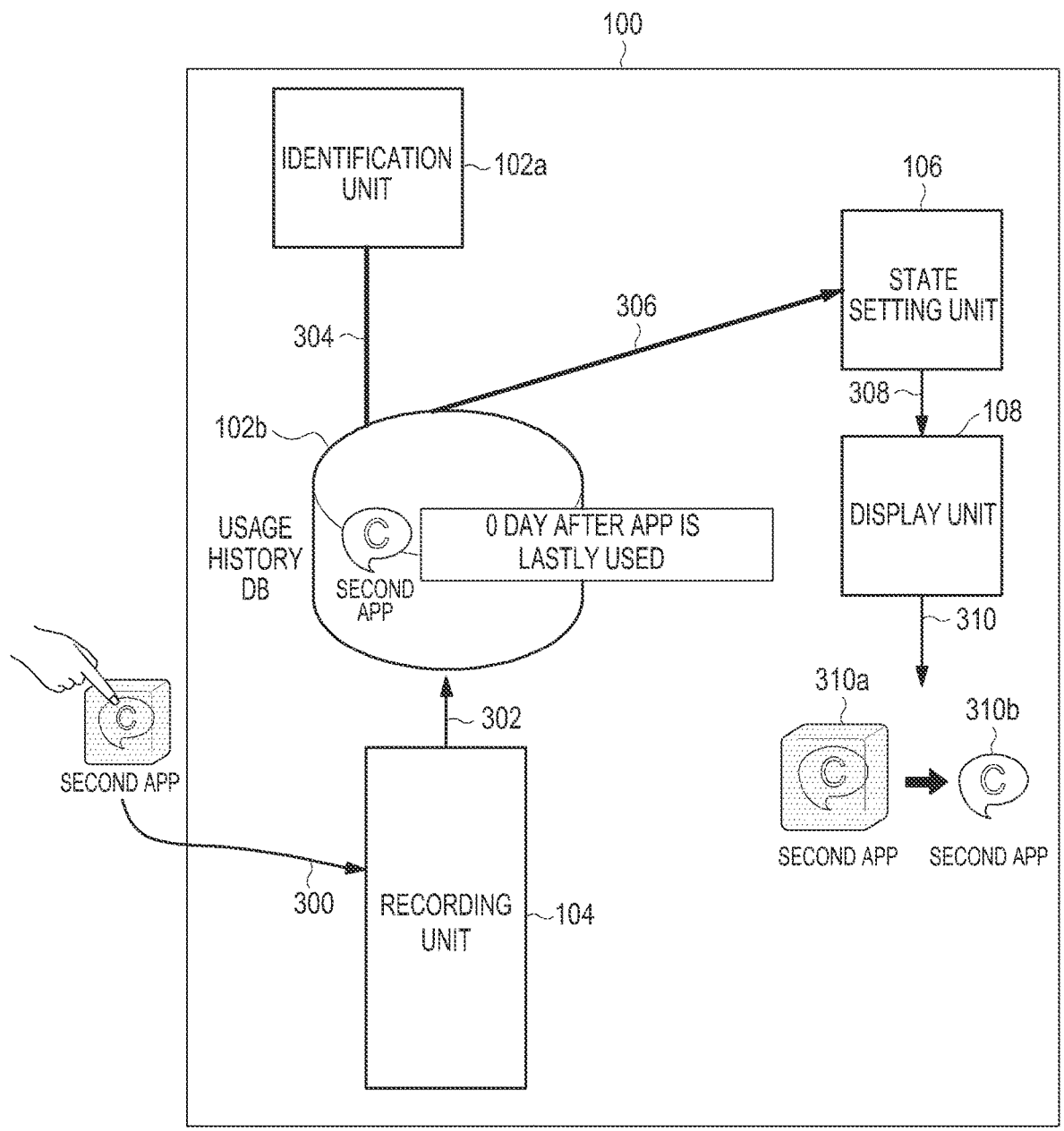
FIG. 3A illustrates an example of a process of changing an inactive state of a package among packages installed in a terminal into an active state according to an embodiment of the present disclosure.

FIG. 3A illustrates an example of a process of changing an inactive state of a package among the packages installed in a terminal into an active state according to an embodiment of the present disclosure. For the convenience of the description, it is assumed that the terminal of FIG. 3A also corresponds to the terminal 100 of FIG. 1.

Referring to FIG. 3A, first, it is assumed that the state of the second APP installed in the terminal 100 is currently changed into the inactive state through the process of FIGS. 2A and 2B. The recording unit 104 detects the use of an application of the second APP in operation 300, and updates the usage history of the second APP stored in the usage history DB 102b in operation 302. That is, as the usage history of the second APP, the recording unit 104 may record the number of days after the application of the second APP is lastly used as "0" in the usage history DB 102b. In operation 304, the identification unit 102a reads the usage history DB 102b at a preset reading time and identifies that the usage history of the second APP meets a preset active state change condition. The active state change condition may include a case where the number of days, for which packages in the inactive state have been recently used, is equal to or smaller than a preset threshold day or a case where a RAM occupancy rate or current consumption is equal to or smaller than a predetermined threshold.

That is, as the identification unit 102a identifies that the number of days after the second APP is lastly used is "0", the identification unit 102a transmits an instruction to change the state of the second APP into the active state to the state setting unit 106 in operation 306. In operation 308, the state setting unit 106 changes the state of the second APP into the active state, and controls the display unit 108 to display, as the icon of the second APP, an icon indicating the changed state, that is, the active state on the display screen of the terminal 100. Accordingly, in operation 310, the display unit 108 removes the ice icon from the icon 310a of the second APP, which overlaps the ice icon, and displays the icon 310b of the second APP indicating the active state. Alternatively, according to an embodiment of the present disclosure, when the icon 310b of the second APP is changed to indicate the active state, the second APP may be immediately executed. That is, an execution screen of the second APP is displayed on the display screen.

Figure 3B:
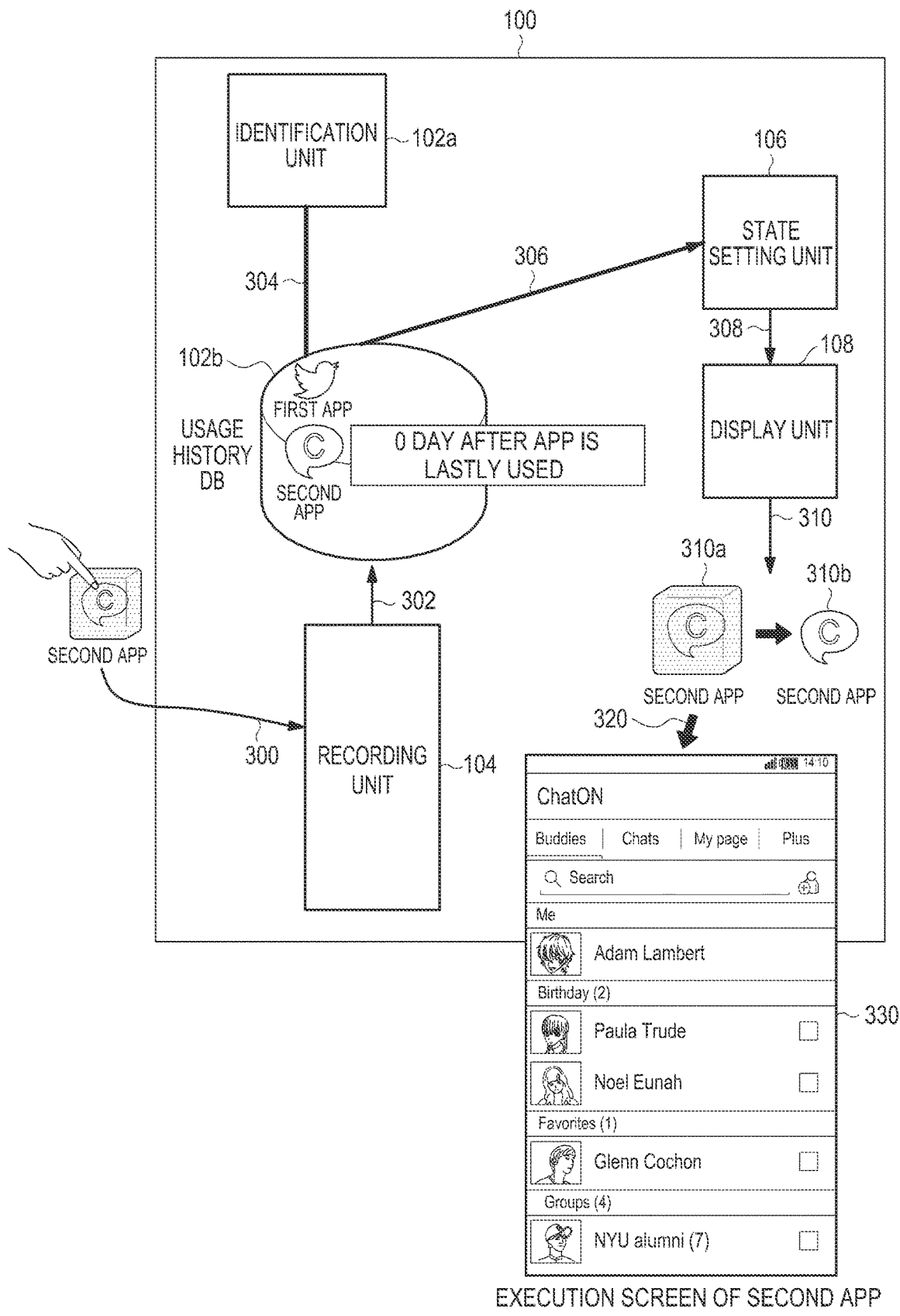
FIG. 3B illustrates an example of a process of changing a package in a "non-used" state into a "used" state and directly executing the package among packages installed in a terminal according to an embodiment of the present disclosure.

FIG. 3B illustrates an example of a process of changing a package in a "non-used" state into a "used" state and directly executing the package among packages installed in a terminal according to an embodiment of the present disclosure.

Referring to FIG. 3B, the operation for changing the icon of the second APP into the icon 310b indicating the active state is similar to that of FIG. 3A and thus many on the steps will not be described again for conciseness. Further, according to an embodiment of the present disclosure, when the inactivate state of the second APP is changed into the active state, an execution screen 330 of the second APP may be displayed on the display screen of the terminal in operation 320.

Meanwhile, as described above, according to an embodiment of the present disclosure, when the number of days for which the corresponding application has not been used, which is one of the conditions for determining a state change of the packages installed in the terminal, is larger than or equal to an inactivation threshold day set to the application, the display unit 108 may display an icon of the application, which is changed to indicate the number of days, for which the application has not been used.

Figure 4A:
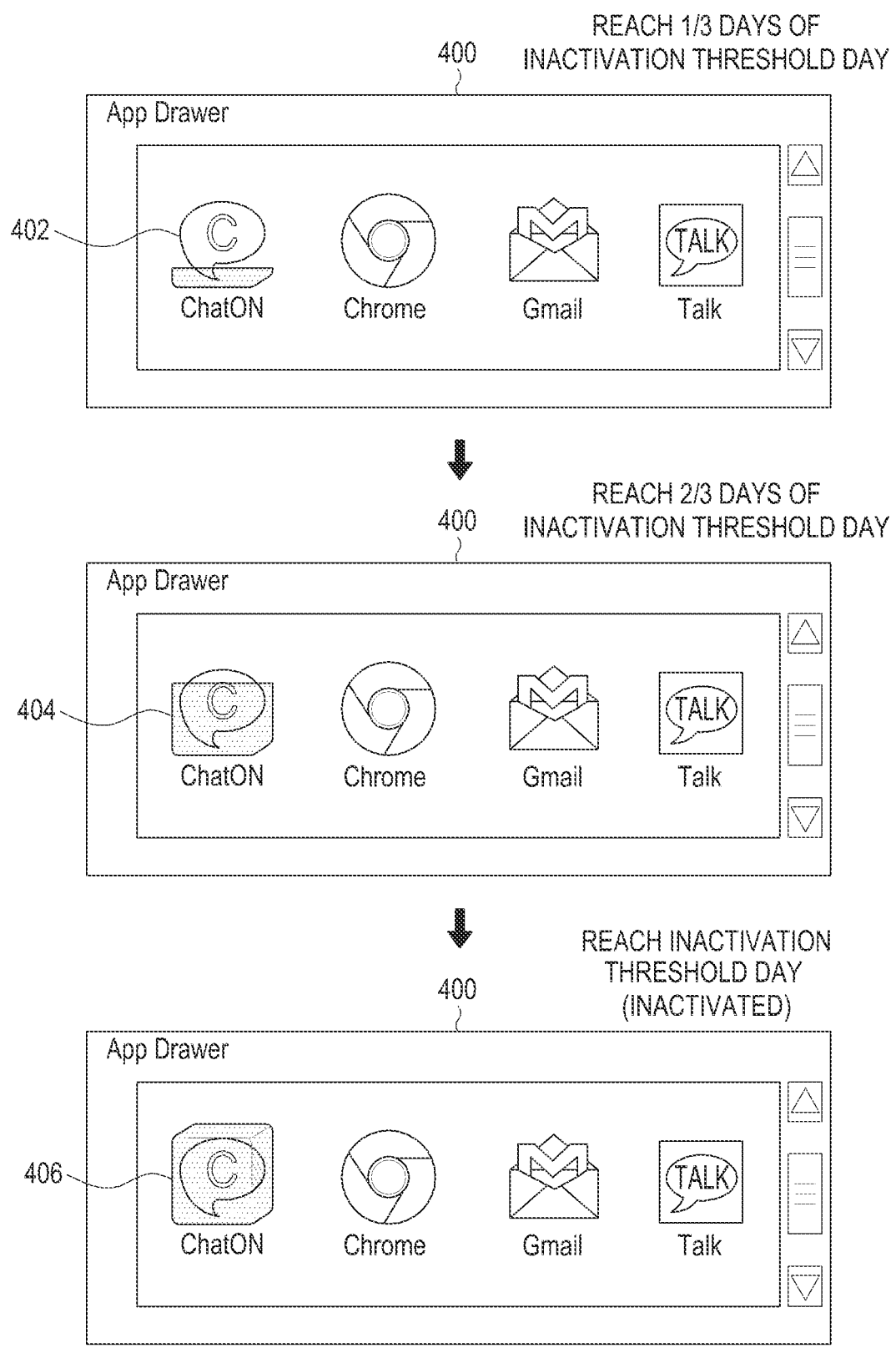
FIG. 4A illustrates an example for displaying a process of changing a User Interface (UI) of an application installed in a terminal into an inactive state according to an embodiment of the present disclosure.

FIG. 4A illustrates an example for displaying a process of changing a UI of the application installed in a terminal into the inactive state according to an embodiment of the present disclosure. It is assumed that the inactive state change condition is configured such that the number of days for which the package installed in the terminal has not been used is larger than or equal to a preset inactivation threshold day. Further, it is assumed that the inactivation threshold day is divided into three equal parts and the icon of the application is differently displayed whenever the number of days for which the application has not been used reaches ⅓ of the inactivation threshold day, ½ of the inactivation threshold day, and the inactivation threshold, which correspond to the three equal parts.

Referring to FIG. 4A, an application drawer 400, which is an application list displayed on the display screen of the terminal, includes icons corresponding to applications of packages installed in the terminal. Further, it is assumed that the number of days for which an application of an icon corresponding to "ChatON" has not been used reaches ⅓ of the predetermined inactivation threshold day. Then, the display unit of the terminal may display an icon 402 generated by partially overlapping only ⅓ of the icon corresponding to "ChatON" with an ice icon within the application drawer 400. Further, it is assumed that the number of days for which the application of the icon corresponding to "ChatON" has not been used reaches ⅔ of the inactivation threshold day. Then, the display unit of the terminal may display an icon 404 generated by partially overlapping only ⅔ of the icon corresponding to "ChatON" with an ice icon within the application drawer 400. Lastly, it is assumed that the number of days for which the application of the icon corresponding to "ChatON" has not been used reaches the inactivation threshold day. Then, the display unit of the terminal may display an icon 406 generated by completely overlapping the icon corresponding to "ChatON" with an ice icon within the application drawer 400.

Figure 4B:
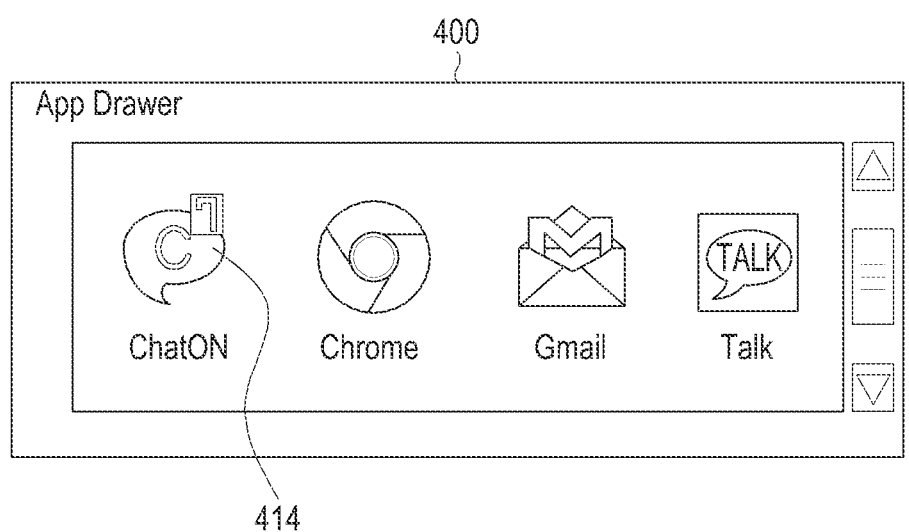
FIG. 4B illustrates an example for displaying a process of changing a UI of an application installed in a terminal into an inactive state according to an embodiment of the present disclosure.

FIG. 4B illustrates an example for displaying a process of changing a UI of an application installed in a terminal into an inactive state according to an embodiment of the present disclosure.

It is assumed that the number of days for which the corresponding application has not been used overlaps the icon of the application in the embodiment of FIG. 4B.

Referring to FIG. 4B, for example, when the number of days, for which the application has not been used, is 7, the display unit of the terminal may display an icon 414 generated by overlapping the number 7 with the icon corresponding to "ChatON" within the application drawer 400. The size of the number corresponding to the number of days, for which the application has not been used, which overlaps the corresponding icon may be configured to be smaller than the icon by a predetermined size, or to be transparent, or to be located at one of the top, center, and bottom of the icon according to a user setting. The user setting may be provided to the user in the form of a popup window including menus.

Further, when the number of days for which "ChatON" has not been used reaches the inactivation threshold, the display unit of the terminal displays an icon 406 generated by completely overlapping the icon corresponding to "ChatON" with the ice icon within the application drawer 400. As a result, the user may identify a state change process of the icon corresponding to "ChatON" by identifying the icons 402 to 406, which the ice icon partially or completely overlaps or the number indicating the number of days for which "ChatON" has not been used overlaps, on the application drawer 400 of the display screen of the terminal. Accordingly, the user according to an embodiment of the present disclosure may stop the state change process of the icon and directly change the identified icon. That is, as described above, the user may directly perform the state change through a preset user input for the corresponding icon, that is, by providing a pressure touch for a predetermined time. Then, the icon may be displayed on the display screen in the form of an icon corresponding to a result in which the user input is reflected.

Figure 5:
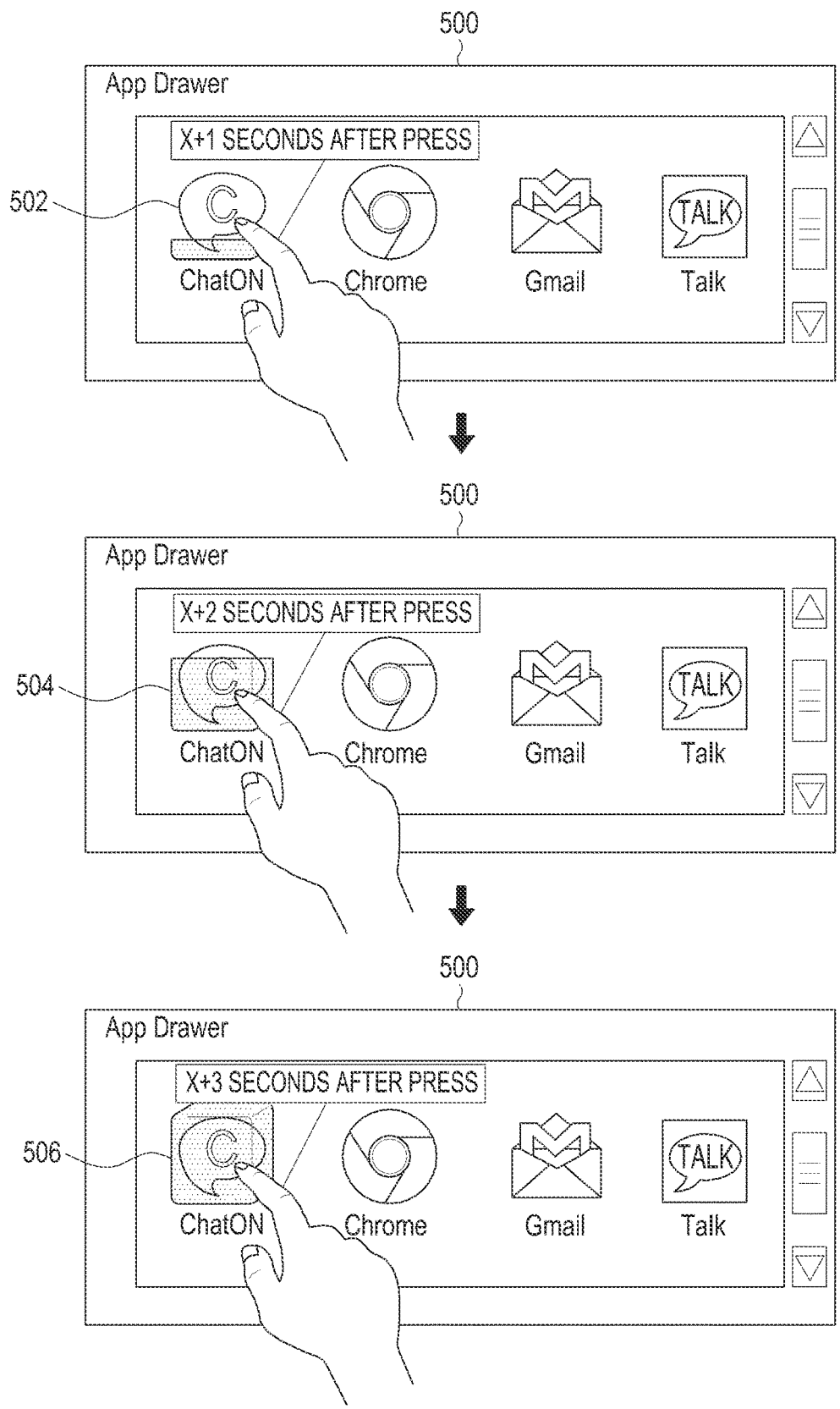
FIG. 5 illustrates an example in which a user directly performs a state change of a predetermined package among packages installed in a terminal according to an embodiment of the present disclosure.

FIG. 5 illustrates an example in which a user directly performs a state change of a predetermined package among packages installed in a terminal according to an embodiment of the present disclosure.

Referring to FIG. 5, similar to FIGS. 4A and 4B, an application drawer 500 displayed on the display screen of the terminal includes icons corresponding to applications of packages installed in the terminal. In this case, it is assumed that the user determines to change the state of the application of the icon corresponding to "ChatON" in the inactive state. Further, it is assumed that the user configures a touch input for a preset time, for example, X+3 seconds as a user input for directly changing the state of the application. Accordingly, when the user provides a touch input for the icon corresponding to "ChatON" as the user input in the application drawer 500, a change process of the icon may be displayed according to the lapse of time.

For example, when the user provides a touch input for ⅓ of X+3 seconds corresponding to the touch input for the state change of the icon corresponding to "ChatON", an icon 502 generated by partially overlapping only ⅓ of the icon with the ice icon is displayed within the application drawer 500. Further, when the user provides a touch input for ⅔ of X+3 seconds corresponding to the touch input for the state change of the icon corresponding to "ChatON", an icon 504 generated by partially overlapping only ⅔ of the icon with the ice icon is displayed within the application drawer 500. Lastly, when the user provides a touch input for X+3 seconds corresponding to the touch input for the state change of the icon corresponding to "ChatON", an icon 506 generated by completely overlapping the icon with the ice icon is displayed within the application drawer 500

Figure 6:
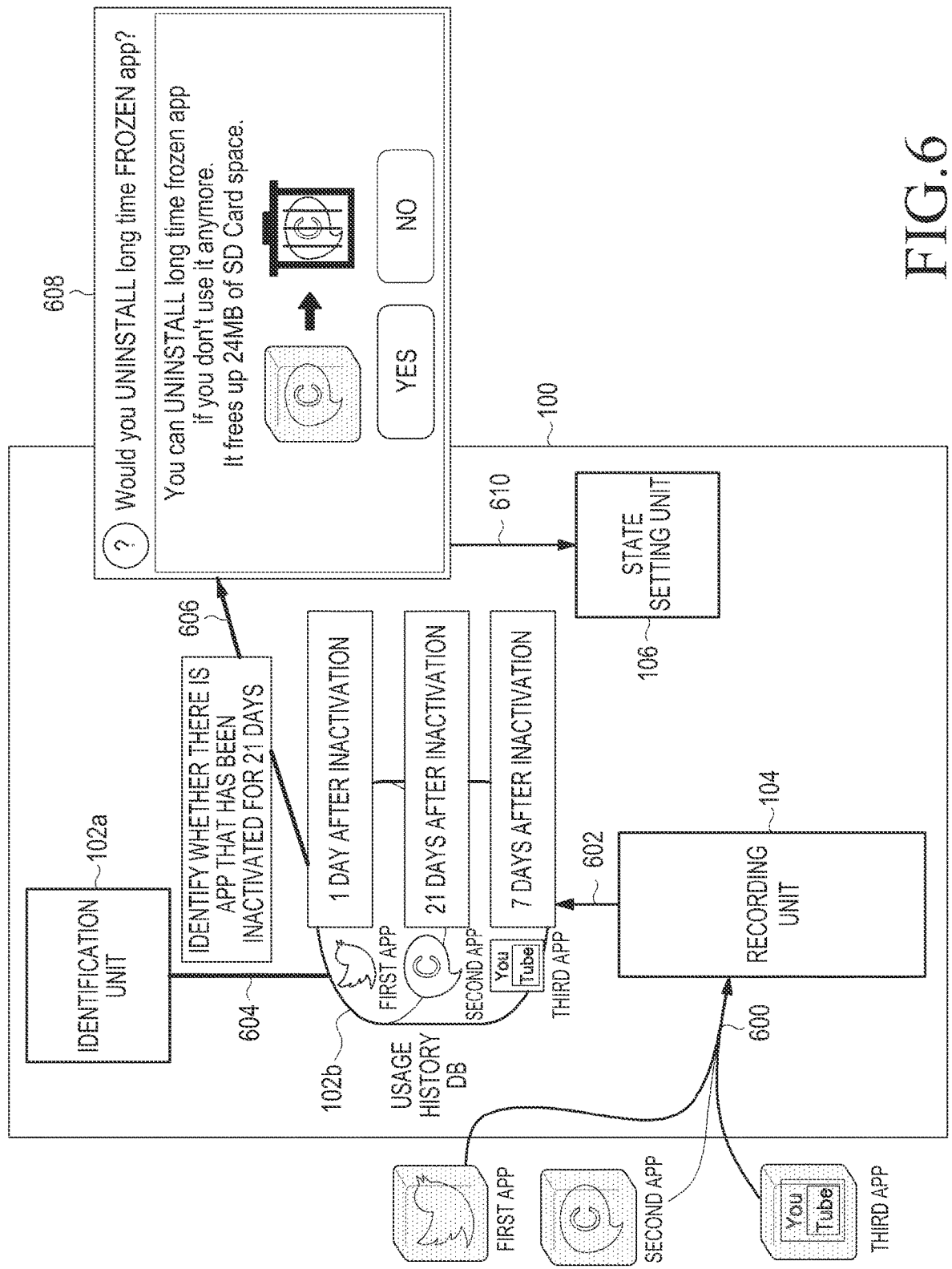
FIG. 6 illustrates an example of an operation for removing a package in an inactive state installed in a terminal according to an embodiment of the present disclosure.

FIG. 6 illustrates an example of an operation for removing a package in an inactive state installed in a terminal according to an embodiment of the present disclosure. For the convenience of the description, it is assumed that the terminal of FIG. 6 also corresponds to the terminal 100 of FIG. 1.

Referring to FIG. 6, in operation 600, the recording unit 104 collects data regarding the time (e.g., numbers of day) for which corresponding applications have not been used, for example, the first APP, second APP, and third APP corresponding to packages in the inactive states among the packages installed in the terminal 100. In operation 602, the recording unit 104 updates the collected numbers of days for which the applications have not been used in the usage history DB 102b as the usage history according to each application.

In operation 604, the identification unit 102a reads the usage history DB 102b at a preset reading time and identifies whether there is an application, which meets a preset removal condition, that is, an application, which has not been used for a predetermined threshold or longer. For example, it is assumed that the usage history DB 102b stores "1 day" as the usage history of the first APP, "21 days" as the usage history of the second APP, and "7 days" as the usage history of the third APP at the reading time. Then, the identification unit 102a may identify the second APP, which meets the removal condition, for example, "the elapse of 21 days" and determine to remove the second APP. According to an embodiment, the identification unit 102a may display a popup window 608 for inquiring the user about whether to remove the second APP through the display screen of the terminal in operation 606. For example, the popup window 608 provides the user with a selection button corresponding to "YES" or "NO" to determine whether to remove the second APP. For example, an icon generated by overlapping the icon of the second APP in the inactive state with the ice icon may be mapped to and displayed on the "YES" button, and an icon generated by overlapping the icon in the inactive state with a recycle bin may be mapped to or displayed on the "NO" button.

In operation 610, the state determination unit 106 determines whether to remove the second APP in response to the user input made through the popup window. When receiving an instruction to remove the second APP from the identification unit 102a, the state determination unit 106 removes the second APP. The instruction may be determined by the identification unit 102a as the second APP meets the removal condition, or may be received as the identification unit 102a detects an input of the "NO" button of the user through the inquiry window 608. Further, when the state determination unit 1060 executes the removal of the second APP, the icon of the second APP disappears from the display screen of the terminal 100.

Figure 7:
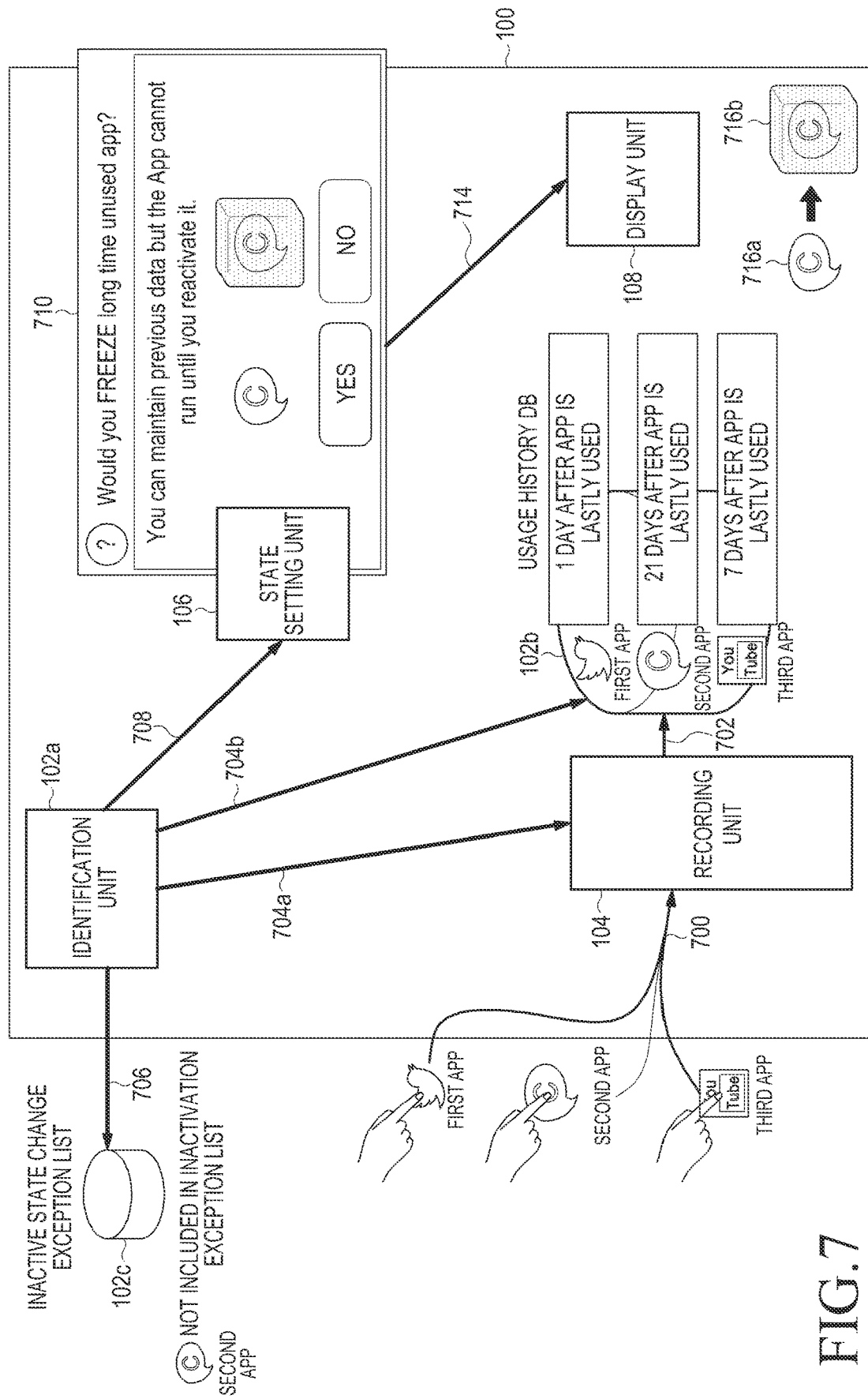
FIG. 7 illustrates an example of an operation for selecting a package included in an inactive state change exception list from packages in a "non-used" state installed in a terminal and stopping a state change according to an embodiment of the present disclosure.

FIG. 7 illustrates an example of an operation for selecting a package included in an inactive state change exception list from packages in a "non-used" state installed in a terminal and stopping a state change according to an embodiment of the present disclosure. For the convenience of the description, it is assumed that the terminal of FIG. 7 also corresponds to the terminal 100 of FIG. 1.

Referring to FIG. 7, as described above, the recording unit 104 collects usage histories of applications installed in the terminal 100, for example, the first APP, second APP, and third APP in operation 700. Further, the recording unit 104 stores the collected usage histories according to each application in the usage history DB 102b in operation 702.

In operation 704a, the identification unit 102a reads the usage history DB 102b at a preset reading time. In operation 704b, the identification unit 102a identifies an application, which meets an inactive state change condition, among the applications. Since operations 704a to 704b are substantially the same as operations 202 to 204 of FIGS. 2A and 2B, a detailed description thereof is omitted. Accordingly, the identification unit 102a identifies whether the pre-stored inactive state change exception list 102c includes the second APP in operation 706 without directly transmitting an instruction to change the state of the second APP, which has been determined to be changed into the inactive state, into the inactive state to the state setting unit 106. When the inactive state change exception list 102c includes the second APP based on a result of the identification, the identification unit 102a maintains a current state of the second APP.

When the inactive state change exception list 102c does not include the second APP, the identification unit 102b transmits the instruction to change the state of the second APP into the inactive state to the state setting unit 106 in operation 708. Alternatively, according to an embodiment of the present disclosure, the identification unit 102a instructs the state setting unit 106 to control the display unit 108 to display a popup window 710 for inquiring about whether to change the state of the second APP into the inactive state on the display screen (not shown) of the terminal 100. Since the popup window may be equal to the popup window 206a of FIGS. 2A and 2B, an overlapping description is omitted.

Further, it is assumed that, when a user input is detected through the popup window 710, the user presses the "YES" button. In this case, the user input may be executed by a touch input of the corresponding button. Then, the identification unit 102a transmits an instruction to change the state of the corresponding application corresponding to the user input to the state setting unit 106. Accordingly, the state setting unit 106 changes the state of the second APP in response to the instruction, and controls the display unit 108 to display an icon to which the changed state of the second APP is applied in operation 714. For example, the state setting unit 106 makes a control to display an icon generated by overlapping the icon of the second APP with the ice icon to indicate that the second APP is in the inactive state. As a result, on the display screen of the terminal, the inactive icon 716a of the second APP is changed into the icon 716b, which the ice icon overlaps, indicating the inactive state.

Figure 8A:
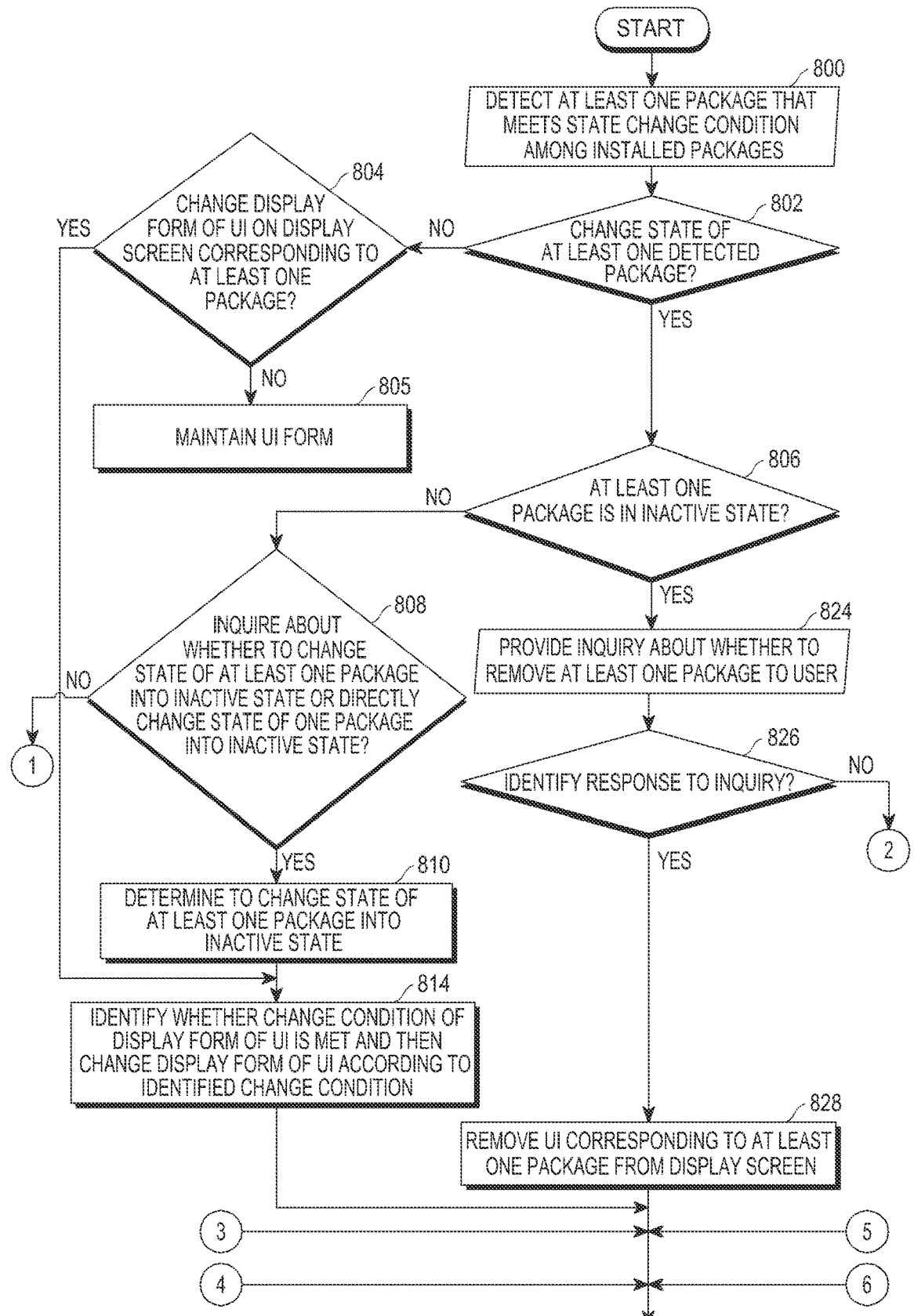
FIGS. 8A, 8B, and 8C illustrate a flowchart illustrating an overall operation for managing packages installed in a terminal according to various embodiments of the present disclosure.
Figure 8B:
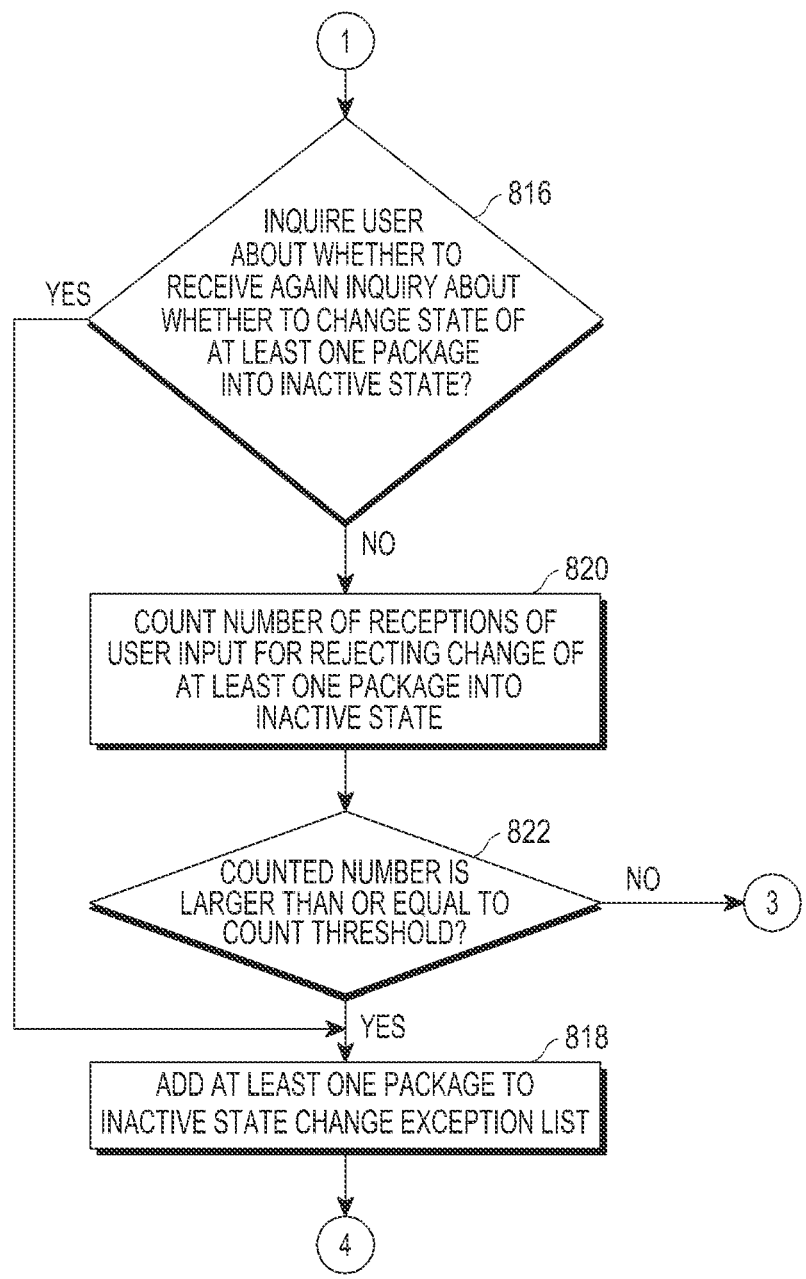
Figure 8C:
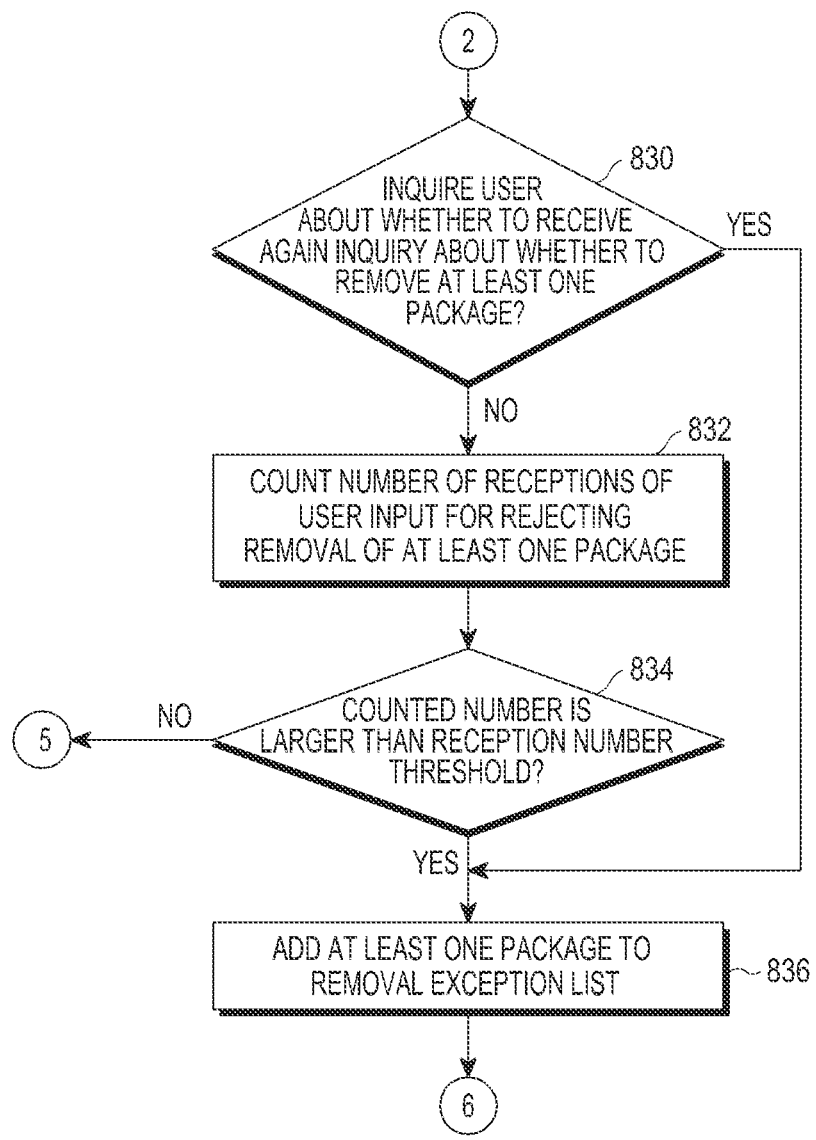

FIGS. 8A to 8C illustrate a flowchart illustrating an overall operation for managing packages installed in a terminal according to various embodiments of the present disclosure. For the convenience of the description, the operations of the terminal are not classified into operations performed by components of the terminal, and are described commonly as the operations of the terminal.

Referring to FIGS. 8A to 8C, when the terminal detects at least one package which meets a preset condition among the packages installed in the terminal in operation 800, the terminal proceeds to operation 802. In operation 802, the terminal determines whether to apply a state change to the detected package. A process for identifying whether the state change is required is performed by identifying whether the preset state change condition is met as described in FIG. 2. The state change includes a change of the application of the corresponding package from the active state to the inactive state, a change from the inactive state to the active state, or a removal of the application. Further, the state change condition also includes the aforementioned inactive state change condition, active state change condition, removal condition, and the like. In addition, a package, which does not meet the state change condition but is approaching the corresponding condition, may be detected among the packages. At this time, the detected packages may be classified into packages which meet a change condition of the UI in the display form.

When the one or more detected packages do not meet the state change condition based on a result of the identification, the terminal identifies whether the packages meet the change condition of the UI in the display form on the display screen corresponding to the one or more packages in operation 804. When the packages do not meet the change condition of the UI in the display form based on a result of the identification, the terminal maintains the UI form in operation 805. When the packages meet the change condition of the UI in the display form as a result of the identification, the terminal proceeds to operation 814. In operation 814, the terminal changes the display form of the UI in response to the change condition of the UI in the display form which the one or more packages meet. More specifically, the aforementioned case of FIGS. 4A and 4B may be described as an example. That is, although the application corresponding to the UE does not meet the current state change condition, a process of reaching the state change condition may be reflected in the display form of the UI and then displayed.

When the state change of the one or more packages is required based on a result of the identification in operation 802, the terminal proceeds to operation 806. In operation 806, the terminal identifies whether the one or more packages are currently in the inactive state. When the states of the one or more packages are in the active state based on a result of the identification, the terminal proceeds to operation 808. In operation 808, the terminal selectively inquires the user about whether to change the states of the one or more packages into the inactive state or determine to directly change the states of the one or more packages into the inactive state. Further, when the terminal determines to directly change the state into the inactive state or receives a user input corresponding to acceptance of the change into the inactive state from the user in response to the inquiry, the terminal changes the states of the one or more packages into the inactive state in operation 810, and then proceeds to operation 814. In operation 814, the terminal changes the display form of the UIs to indicate that the UIs corresponding to the one or more packages are in the inactive state on the display screen.

Meanwhile, when the terminal receives a user input corresponding to rejection of the change into the inactive state of the one or more packages from the user in operation 808, the terminal proceeds to operation 816. In operation 816, the terminal asks the user about whether to receive the inquiry again about whether to change the states of the one or more packages into the inactive state. When the terminal receives a response indicating no need to receive the inquiry from the user based on a result of the inquiry, the terminal adds the one or more packages to the pre-stored inactive state change exception list in operation 818.

When the terminal receives a response indicating one more reception of the inquiry from the user based on a result of the inquiry, the terminal proceeds to operation 820. In operation 820, the terminal counts the number of times by which the terminal receives the user input corresponding to the rejection from the user in response to the inquiry. Further, in operation 822, the terminal identifies whether the counted number of receptions is larger than or equal to a reception number threshold. When the counted number of receptions is larger than or equal to the reception number threshold based on a result of the identification, the terminal proceeds to operation 818. When the counted number of receptions is smaller than the reception number threshold, the terminal ends the operation.

When the one or more packages are in the inactive state based on a result of the identification of operation 806, the terminal inquires the user about whether to remove the one or more packages in operation 824. As described in FIG. 6, the inquiry may be provided in the form of the popup window on the display screen of the terminal. Further, in operation 826, the terminal identifies a response to the inquiry. When the response is a user input making a request for removing the one or more packages based on a result of the identification, the terminal removes the UIs corresponding to the one or more packages from the display screen in operation 828.

When the response is a user input rejecting the removal of the one or more packages based on a result of the identification, the terminal asks the user about whether to receive again the inquiry about whether to remove the one or more packages in operation 830. When the terminal receives a response indicating one more reception of the inquiry from the user based on a result of the inquiry, the terminal proceeds to operation 832. In operation 832, the terminal counts the number of times by which the terminal receives the user input rejecting the removal of the one or more packages. Further, in operation 834, the terminal identifies whether the counted number of receptions is larger than or equal to a reception number threshold. When the counted number of receptions is larger than or equal to the reception number threshold based on a result of the identification, the terminal adds the one or more packages to the removal exception list including the packages to which the operation for removing the UIs of the installed packages is not applied in operation 836. When the counted number of receptions is smaller than the reception number threshold based on a result of the identification, the terminal ends the operation.

Meanwhile, according to an embodiment of the present disclosure, applications using a push service may be included in one category. For example, the application included in the category may be Google Cloud Messaging (GCM). In a case of packages included in the category using the push service, when an inactive threshold time is configured to, for example, "10 minutes" and a screen off state of the corresponding terminal is maintained for 10 minutes, the identification unit 102a of FIG. 1 may transmit an instruction to change the state of the corresponding package into the inactive state to the state setting unit 106. Further, when a push message is received in the inactive state of the package, the state of the package may be automatically changed into the active state.

Figure 9:
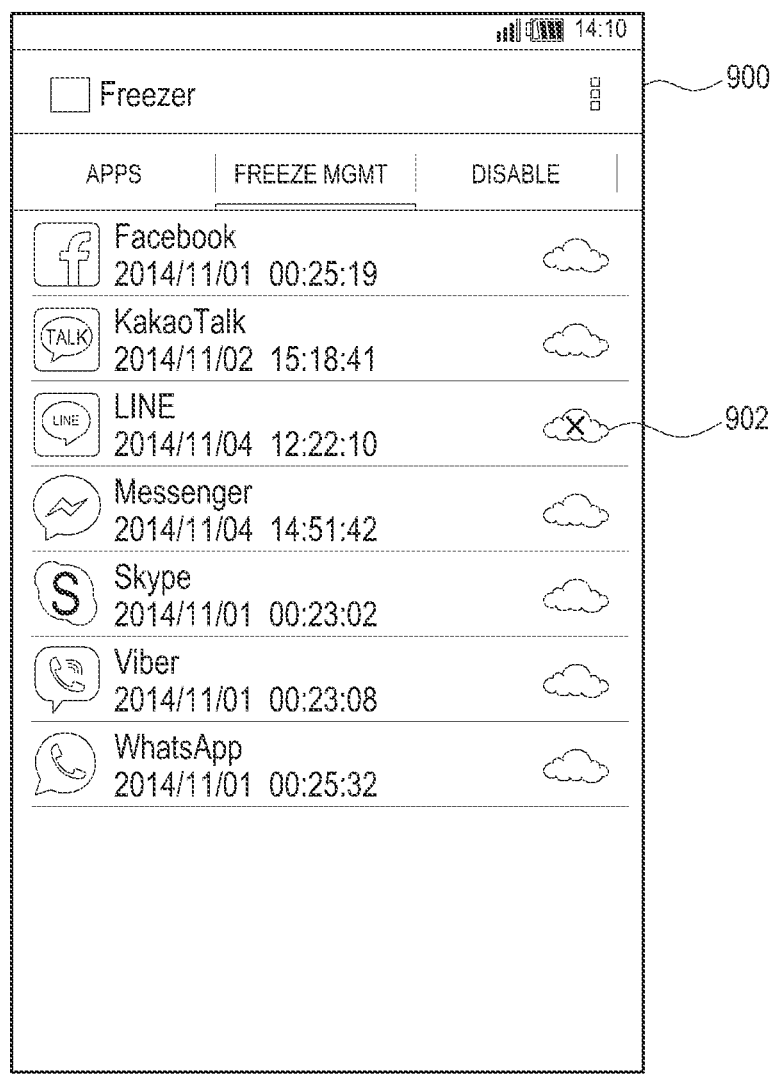
FIG. 9 illustrates various embodiments showing whether packages using a push service are in an inactive state according to an embodiment of the present disclosure.

FIG. 9 illustrates various embodiments showing whether packages using a push service are in an inactive state according to an embodiment of the present disclosure.

Referring to FIG. 9, packages having a cloud indication among the installed packages on a display unit 900 remain in a screen off state for 10 minutes and thus the state thereof is changed into the inactive state as the push service is used. Further, a package 902 having a cloud indication with x is a package configured to the inactive state directly by the user.

Figure 10:
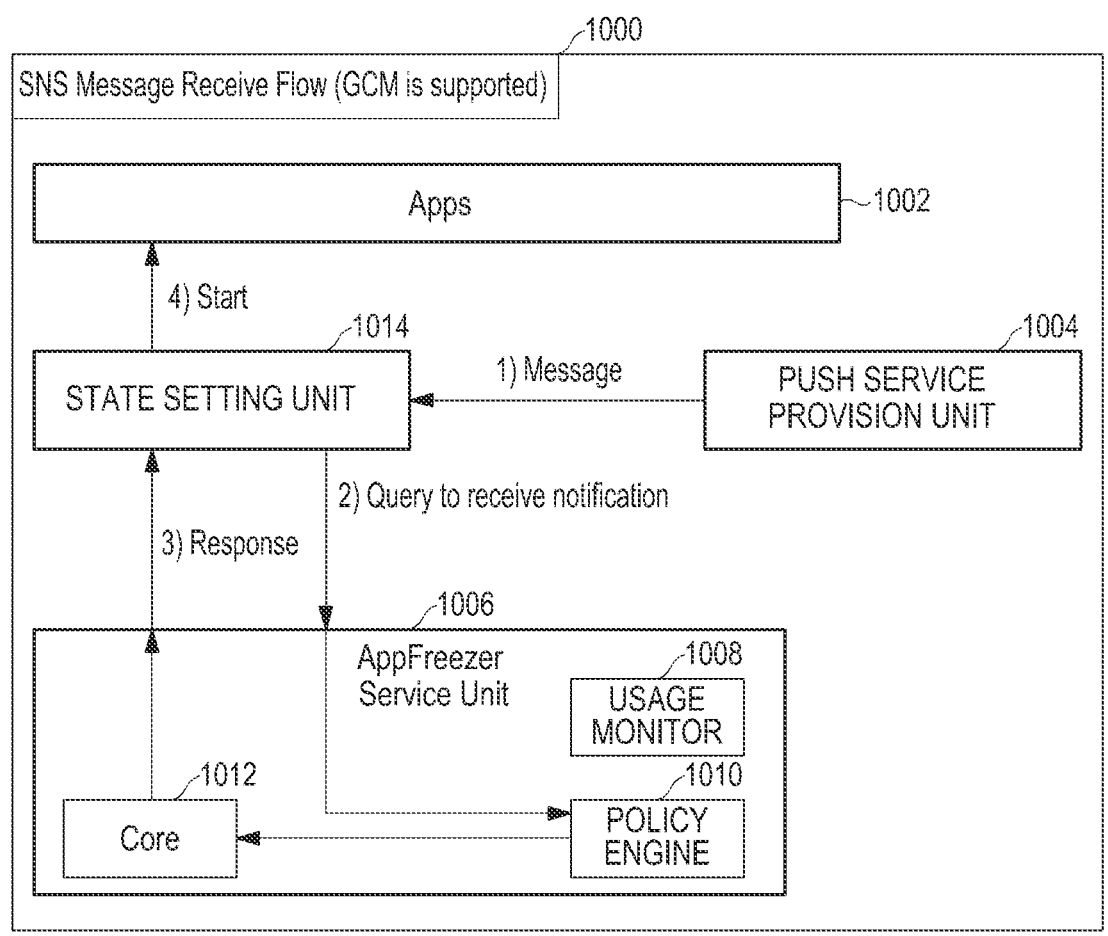
FIG. 10 is a flowchart illustrating an operation for applying an inactive state to packages using a push service according to an embodiment of the present disclosure.

FIG. 10 is a flowchart illustrating an operation for applying an inactive state to packages using a push service according to an embodiment of the present disclosure.

Referring to FIG. 10, in order to change the state of an application installed in a terminal 1000 into the inactive state, the terminal 1000 may include, for example, an AppFreezer service unit 1006, which includes a usage monitor 1008 for detecting whether an application is used, a policy engine 1010, and a core 1012, and a state setting unit 1014.

Further, it is assumed that a condition configured by the policy engine 1010, in which the state of Apps 1002 is changed into the inactive state, corresponds to a case where a screen off state of the terminal 1000 is maintained for a predetermined threshold time. Accordingly, when the usage monitor 1008 detects the maintenance of the screen off state of the Apps 1002 for the threshold time, the usage monitor 1008 transmits a detection report to the core 1012. Then, the core 1012 transmits an instruction to change the state of the package of the Apps 1002 into the inactive state to the state setting unit 1014. The state setting unit 1014 having received the instruction changes the state of the package of the Apps 1002 into the inactive state on the display screen of the terminal.

It is assumed that the Apps 1002 correspond to applications using the push service. Except for a case where the inactive state change condition configured by the policy engine 1010 is not met, a case where a push message received by the Apps 1002 through a push service provision unit 1004 as an example of the provision of the push message by the state setting unit 1014 may be used as a condition for reconstructing the inactive state of the Apps 1002. For example, when the state setting unit 1014 receives the push message, the state setting unit 1014 transmits the push message to the core 1012 through the policy engine 1010. Then, the core 1012 transmits an instruction to change the state of the Apps 1002 into the active state to the state setting unit 1014. The state setting unit 1014 may identify the state of the Apps 1002, and, when the state of the Apps 1002 is the inactive state, change the state of the Apps 1002 into the active state.

As described above, in a case of the applications supporting the push service, when the push service is received in the inactive state, the active state change condition may be recognized and the state of the corresponding package may be changed into the active state.

Meanwhile, in a case of an application providing a messaging service, when a message is received from a particular counterpart in a state where the inactive state change condition is met and thus the change into the inactive state is made, the reception of the message should be informed of to the user. In this case, when the application providing the messaging service does not support the push service, the application may identify a received message on every predetermined cycle (for example, every three hours) even in the inactive state. When there is the received message in the corresponding cycle, an alarm informing of the existence of the message may be displayed on the display screen. Meanwhile, it is assumed that the application providing the messaging service supports the push service. In this case, when reception of a push message for the application is detected in the inactive state of the application regardless of the predetermined cycle, the terminal may change the state of the application into the active state and display the application on the display screen.

Figure 11A:
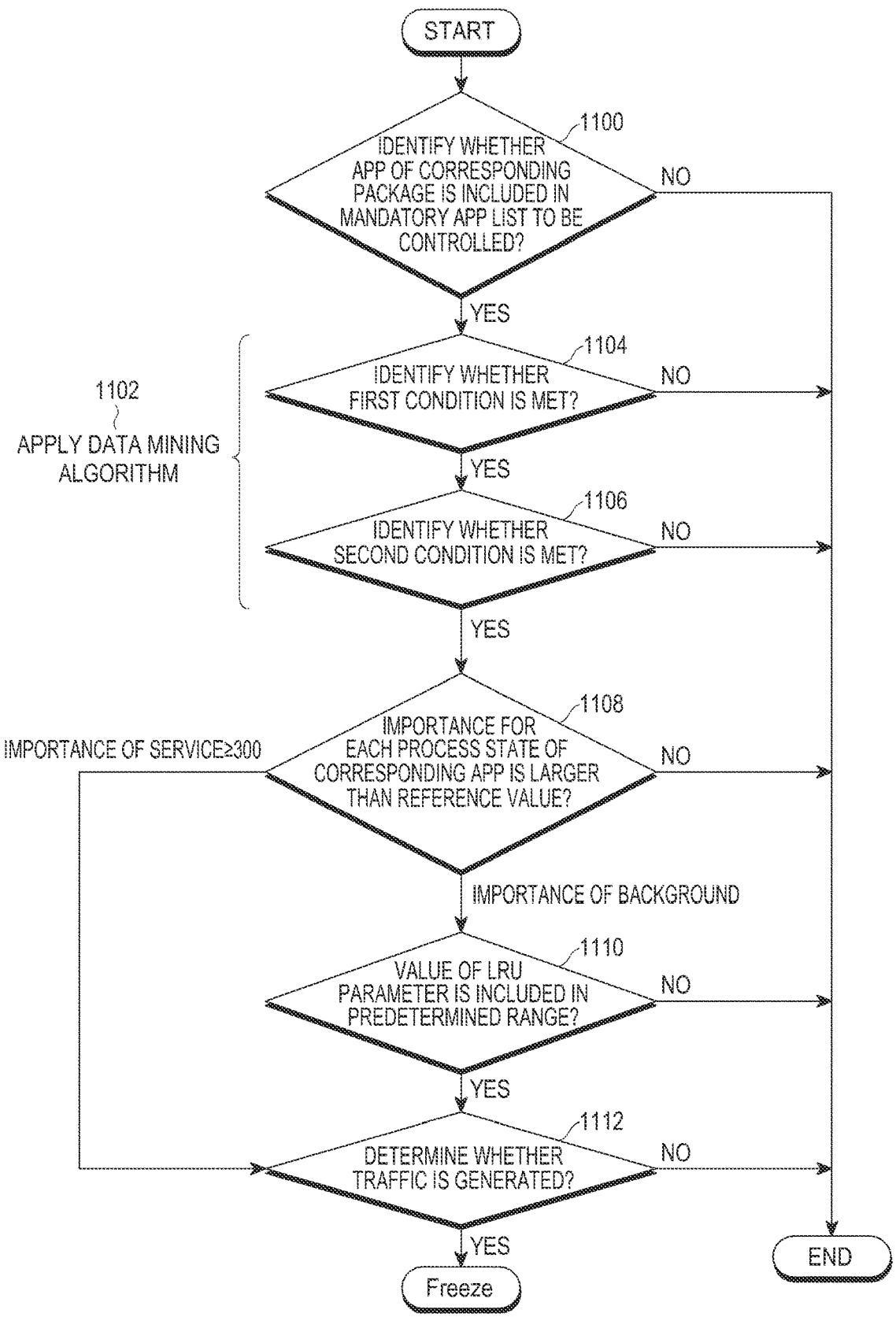
FIG. 11A is a flowchart illustrating an operation for managing packages installed in a terminal according to an embodiment of the present disclosure.

FIG. 11A is a flowchart illustrating an operation for managing packages installed in a terminal according to an embodiment of the present disclosure. For example, the following description will be made based on an assumption that the terminal uses an Android operating system.

Referring to FIG. 11A, the user identifies whether an App of the corresponding package among the installed packages is included in a list (hereinafter, referred to as a "mandatory App List to be controlled") of application, which can be changed into the inactive state regardless of a preset state change condition in operation 1100. The mandatory App List to be controlled may be preset by default within the terminal, or may be constructed by the user in consideration of predetermined conditions. At this time, the predetermined conditions may include a usage frequency, relative battery consumption, and the like. For example, the user may insert a package corresponding to an App, which meets at least one of the condition in which the usage frequency is smaller than a usage count threshold and the condition in which the relative battery consumption is also smaller than a threshold, among the packages installed in the terminal into the mandatory App List to be controlled.

When the App of the corresponding package is included in the mandatory App List to be controlled based on a result of the identification, the user may determine whether to apply the change of the state of the corresponding package into the inactive state by applying a data mining algorithm to the Apps included in the mandatory App List to be controlled in operation 1102. The data mining algorithm corresponds to a method of determining whether to change the state into the inactive state based on information empirically acquired through execution of the App of the corresponding package, which is performed based on two functions according to an embodiment in operations 1104 and 1106. Accordingly, in the present embodiment, the user identifies whether the App of the corresponding package meets a first condition in operation 1104. The first condition may include at least one of a battery consumption level, a non-used period, and an App package relation. For example, the condition corresponds to a case where the battery consumption level is larger than or equal to a battery threshold, the non-used period is longer than a predetermined time, or the number of Apps related to the App of the corresponding packages is smaller than a predetermined number. When the App of the corresponding package meets the first condition based on a result of the identification, the user proceeds to operation 1106. Alternatively, when the App of the package does not meet the first condition based on the result of the identification, the user ends the operation.

In operation 1106, the user identifies whether the package meets a second condition. The second condition may include at least one of a currently remaining memory size of the terminal, a used amount of a memory of the package, and the number of installed Apps. For example, the condition may correspond to a case where the remaining memory size of the terminal is smaller than a predetermined threshold, the used amount of the memory of the package is larger than a memory threshold, or the number of installed Apps related to the package is larger than a threshold. When the App of the package meets the second condition based on a result of the identification, the user proceeds to operation 1108. When the App of the package does not meet the second condition based on the result of the identification, the user ends the operation.

In operation 1108, the user identifies process importance of each process state for the App of the package. The importance of each process state may be divided and measured according to a service and background for each process state.

FIG. 11B is a table showing a mapping relation of the importance of each process state according to an embodiment of the present disclosure.

Referring to FIG. 11B, for example, the user divides the process for the App of the corresponding package and identifies whether the importance of each process is larger than or equal to a preset threshold. It is assumed that the threshold of the importance for the service of the corresponding process is configured to, for example, "300", and the threshold of the importance for the background is configured to, for example, "400". For reference, in FIG. 11B, processes having the importance larger than or equal to the preset threshold are expressed in bold.

Referring again to FIG. 11A, when the importance of the service is larger than or equal to 300 based on a result of the identification in operation 1108, the user proceeds to operation 1112 and determines whether traffic is generated in the App. When the traffic is not generated based on a result of the determination, the user changes the state of the App into the inactive state. Alternatively, when the importance of the background of the App corresponds to the preset threshold, for example, "400", the user proceeds to operation 1110. When there is an LRU parameter or a parameter having a value included in a predetermined range (for example, a value 5 or a value from 7 to 15) among parameters having priorities to be first removed when a memory for each process state is lacking in operation 1110, the user proceeds to operation 1112. When the value of the parameter is not included in the predetermined range in operation 1110, that is, when the corresponding value is neither 5 nor one from 7 to 15, the user ends the operation.

FIG. 11C is a table showing priorities to be first controlled when a memory for each process state is lacking according to an embodiment of the present disclosure.

Referring to FIG. 11C, flags having the value 5 or the value from 7 to 15 are expressed in bold.

When the user identifies that the traffic is not generated in the App of the corresponding package in operation 1112, the user changes the state of the package of the App into the inactive state in operation 1114. When the traffic is generated in the App based on a result of the identification, the user maintains the current state of the package.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and the equivalents.

What is claimed is:

1. A method of managing application packages installed in a mobile communication terminal, the method comprising:

detecting, by at least one processor, at least one application package which meets a condition for changing a state of the at least one application package into an inactive state among the application packages;

identifying, by the at least one processor, whether the at least one application package is included in a pre-stored change exception list, the pre-stored change exception list including one or more application packages configured to not change state to the inactive state though the condition is met;

in a case that the at least one application package is not included in the change exception list, changing, by the at least one processor, the state of the at least one application package into the inactive state;

changing, by the at least one processor, a user interface corresponding to the at least one application package to indicate the inactive state of the at least one application package; and displaying the changed user interface on a user screen, wherein the detecting of the at least one application package which meets the condition for changing the state further comprises:

selecting a predetermined number of application packages according to a descending order of a plurality of random access memory (RAM) occupancy rates, each RAM occupancy rate of the plurality of RAM occupancy rates being based on a number of times in which each of the predetermined number of selected application packages is loaded into RAM for execution, identifying execution frequencies of the predetermined number of selected application packages, and determining the application package of which an execution frequency is equal to or smaller than a threshold among the predetermined number of selected application packages.

2. The method of claim 1, wherein the displaying of the changed user interface on the user screen further comprises:

displaying a screen requesting a user input corresponding to acceptance or rejection of an operation for changing the state of the at least one application package into the inactive state on the user screen; and in a case that the user input indicating the acceptance of the operation is received:

changing, by the at least one processor, the user interface corresponding to the at least one application package to show the inactive state of the at least one application package, and displaying the changed user interface on the user screen.

3. The method of claim 1, further comprising:

in a case that the at least one application package is in the inactive state, displaying a screen asking for a user input corresponding to acceptance or rejection of removal of the at least one application package on the user screen; and in a case that the user input indicating the acceptance of the removal is received, removing, by the at least one processor, the at least one application package.

4. The method of claim 1, further comprising:

in a case that a first application package, which has not been used for a predetermined period, is among the at least one application package:

changing, by the at least one processor, a user interface corresponding to the at least one application package into a form indicating a number of days for which the at least one application package has not been used, and displaying the changed user interface on the user screen.

5. The method of claim 1, wherein the condition for changing the state of the at least one application package is further configured based on a number of days for which a corresponding application of the at least one application package has not been used.

6. The method of claim 5, further comprising:
automatically changing, by the at least one processor, a user interface of an application package which meets the condition larger than or equal to the threshold, among the at least one application package, into a form indicating the number of days for which the at least one application package has not been used up to a present time until the threshold is met; and
displaying the changed user interface on the user screen.

7. The method of claim 6, wherein the threshold is differently configured according to a category of each of the at least one application package and a user's preference.

8. The method of claim 1, further comprising:
detecting, by the at least one processor, reception of a push service by a package using the push service among the at least one application package; and
in a case that the package using the push service is in the inactive state, changing, by the at least one processor, the state of the at least one application package using the push service into an active state.

9. The method of claim 1, further comprising:
identifying, by the at least one processor, whether the at least one application package is included in an inactive state change list; and
in a case that one or more application packages are included in the inactive state change list, identifying, by the at least one processor, whether the one or more application packages meet the condition for changing into the inactive state.

10. A mobile communication terminal managing installed application packages, the mobile communication terminal comprising:
a transceiver;
a screen; and
at least one processor configured to:
detect at least one application package which meets a condition for changing a state of the at least one application package into an inactive state among the application packages,
identify whether the at least one application package is included in a pre-stored change exception list, the pre-stored change exception list including one or more application packages configured to not change state to the inactive state though the condition is met,
change the state of the at least one application package into the inactive state if the at least one application package is not included in the change exception list,
change a user interface corresponding to the at least one application package to indicate the inactive state of the at least one application package, and
control the screen to display the changed user interface,
wherein, to detect the at least one application package which meets the condition for changing the state, the at least one processor is further configured to:
select a predetermined number of application packages according to a descending order of a plurality of random access memory (RAM) occupancy rates, each RAM occupancy rate of the plurality of RAM occupancy rates being based on a number of times in which each of the predetermined number of selected application packages is loaded into RAM for execution,
identify execution frequencies of the predetermined number of selected application packages, and
determine the application package of which an execution frequency is equal to or smaller than a threshold among the predetermined number of selected application packages.

11. The mobile communication terminal of claim 10, wherein the at least one processor is further configured to:
control the screen to display a screen requesting a user input corresponding to acceptance or rejection of an operation for changing the state of the at least one application package into the inactive state on the user screen, and,
in a case that the user input indicating the acceptance of the operation is received:
change the user interface corresponding to the at least one application package to show the inactive state of the application package, and
control the screen to display the changed user interface.

12. The mobile communication terminal of claim 10,
wherein, in a case that the at least one application package is in the inactive state, the at least one processor is further configured to display a screen asking for a user input corresponding to acceptance or rejection of removal of the at least one application package on the user screen, and,
wherein, in a case that the user input indicating the acceptance of the removal is received, the at least one processor is further configured to remove the at least one application package.

13. The mobile communication terminal of claim 10, wherein, in a case that a first application package, which has not been used for a predetermined period, is detected among the at least one application package, the at least one processor is further configured to:
change a user interface corresponding to the at least one application package into a form indicating a number of days for which the at least one application package has not been used, and
control the screen to display the changed user interface on the user screen.

14. The mobile communication terminal of claim 10, wherein the condition for changing the state of the at least one application package is further configured based on at least one of a number of days for which a corresponding application of the at least one application package has not been used.

15. The mobile communication terminal of claim 14, wherein the at least one processor is further configured to:
automatically change a user interface of a first application package which meets the condition larger than or equal to the threshold, among the at least one application package, into a form indicating the number of days for which the at least one application package has not been used up to a present time until the threshold is met, and
control the screen to display the changed user interface on the user screen.

16. The mobile communication terminal of claim 15, wherein the threshold is differently configured according to a category of each of the at least one application package and a user's preference.

17. The mobile communication terminal of claim 10, wherein the at least one processor is further configured to:
detect reception of a push service by a package using the push service among the at least one application package, and in a case that the package using the push service is in the inactive state, change the state of the at least one application package using the push service into an active state.

18. The mobile communication terminal of claim 10, wherein the at least one processor is further configured to:
   identify whether the at least one application package is included in an inactive state change list, and
   in a case that one or more application packages are included in the inactive state change list, identify whether the one or more application packages meet the condition for changing into the inactive state.

19. The method of claim 1, wherein the change exception list is installed in the mobile communication terminal or is set by a user.

20. The mobile communication terminal of claim 10, wherein the change exception list is installed in the mobile communication terminal or is set by a user.

21. The method of claim 1, wherein the condition for changing the state of the at least one application package is configured further based on current consumption of the at least one application.

22. The mobile communication terminal of claim 10, wherein the condition for changing the state of the at least one application package is configured further based on current consumption of the at least one application.

* * * * *